(12) United States Patent
Ley et al.

(10) Patent No.: US 8,287,934 B2
(45) Date of Patent: Oct. 16, 2012

(54) USE OF DIACETYL DIMER AS AN AROMATIC AND/OR FLAVOURING SUBSTANCE

(75) Inventors: Jakob Ley, Holzminden (DE); Berthold Weber, Höxter (DE); Gerhard Krammer, Holzminden (DE); Ingo Reiss, Holzminden (DE); Heinz-Jürgen Bertram, Holzminden (DE); Ian Gatfield, Höxter (DE); Petra Hoffmann-Lücke, Delligsen (DE)

(73) Assignee: Symrise AG, Holzminden (DE)

( * ) Notice: Subject to any disclaimer, the term of this patent is extended or adjusted under 35 U.S.C. 154(b) by 491 days.

(21) Appl. No.: 12/300,820

(22) PCT Filed: May 7, 2007

(86) PCT No.: PCT/EP2007/054401
§ 371 (c)(1),
(2), (4) Date: Mar. 26, 2009

(87) PCT Pub. No.: WO2007/141102
PCT Pub. Date: Dec. 13, 2007

(65) Prior Publication Data
US 2010/0062030 A1    Mar. 11, 2010

Related U.S. Application Data

(60) Provisional application No. 60/803,715, filed on Jun. 2, 2006.

(51) Int. Cl.
*A23L 1/22* (2006.01)
*A61K 8/02* (2006.01)

(52) U.S. Cl. .............. 426/536; 426/534; 424/401

(58) Field of Classification Search .............. None
See application file for complete search history.

(56) References Cited

U.S. PATENT DOCUMENTS

| | | | |
|---|---|---|---|
| 3,980,675 A | 9/1976 | Venturello et al. | |
| 4,092,333 A | 5/1978 | Mookherjee et al. | |
| 4,092,334 A * | 5/1978 | Mookherjee et al. | 549/473 |
| 4,096,158 A | 6/1978 | Evers et al. | |
| 4,251,195 A | 2/1981 | Suzuki et al. | |
| 4,481,157 A | 11/1984 | Morishita et al. | |
| 4,889,736 A | 12/1989 | Doornbos et al. | |

FOREIGN PATENT DOCUMENTS

| | | | |
|---|---|---|---|
| EP | 0293957 | * | 4/1988 |
| EP | 293957 | | 12/1988 |
| EP | 0293957 | * | 12/1991 |
| GB | 1057666 | | 2/1967 |
| WO | WO-2006058893 | | 6/2006 |

OTHER PUBLICATIONS

Fliss et al. "The Reaction of Chymotrypsin with 2,3-Butanedione Trimer", Can J Biochem, 1975, 53,275-283.*

Fors "Sensory Properties of Volatile Maillard Reaction Products and Related Compounds" ACS Symposioum Series, 1983, 185-286.*
Fliss et al. "The Reaction of Chymotrypsin with 2,3-Butanedione Trimer" Can J Biochem, 53, 1975, 275-283.*
Shapiro R., et al: "A new self-condensation product of biacetyl.", The Journal of Organic Chemistry, Aug. 1966, vol. 31, No. 8, Aug. 1966, pp. 2710-2712, XP002445985, ISSN: 0022-3263, p. 2711, right column, Compound 5.
Pechmann H. Von: "Studien über 1. 2-Diketon", Chemische Berichte, vol. 21, No. 1, 1888, pp. 1411-1422, XP002445986, p. 1417-p. 1418.
Diels O., et al., Chem. Ber. 1914, vol. 47, pp. 2355-2365.
Hudec J., et al., "Stereochemistry of the Products of Base Catalyzed Self-Condensation of Biacetyl," Heterocycles, vol. 43, No. 10, 1996, pp. 2125-2129.
Birch, A.J., et al., "Studies in Relation to Biosynthesis. Part X. A Synthesis of Lumichrome from Non-benzenoid Precursors," J. Chem. Soc. 1957, pp. 412-414.
Venturello, C., et al., "A New Synthesis of 2, 5-Dimethyl-3(2H)-furanone," Synthesis 1977, pp. 754-755.

* cited by examiner

*Primary Examiner* — Daniel Sullivan
*Assistant Examiner* — Melissa Javier
(74) *Attorney, Agent, or Firm* — Connolly Bove Lodge & Hutz LLP

(57) ABSTRACT

The invention relates to the use of 5-acetyl-2,5-dimethyl-2-hydroxy-tetrahydrofuran-3-one (diacetyl dimer of formula (I)) in the form of one of its stereoisomers or in the form of a mixture consisting of or containing two, three or four of its stereoisomers

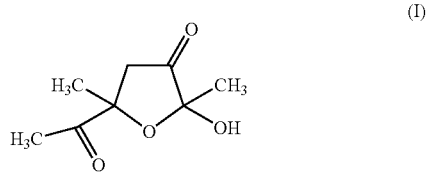

(I)

(i) for imparting, intensifying and/or modifying a creamy and/or fatty sensation in the mouth,
(ii) for imparting, intensifying and/or modifying a sweet, buttery, cream-like and/or creamy flavor; and/or
(iii) as an aromatic and/or flavoring substance.

The invention furthermore relates to a process (i) for imparting, intensifying and/or modifying a creamy and/or fatty sensation in the mouth, (ii) for imparting, intensifying and/or modifying a sweet, buttery, cream-like and/or creamy flavor, to corresponding aromatic compositions, to formulations selected from a nutrition formulation (foodstuff), an oral hygiene formulation, a luxury product formulation, a formulation for oral pharmaceutical use or a semi-finished good formulation for the preparation of nutrition formulations or luxury product formulations, as well as preparations comprising one or more of said compositions and/or formulations.

20 Claims, No Drawings

USE OF DIACETYL DIMER AS AN AROMATIC AND/OR FLAVOURING SUBSTANCE

CROSS-REFERENCE TO RELATED APPLICATIONS

This application claims benefit of priority to PCT/EP2007/054401, filed on May 7, 2007, which asserts priority to U.S. Provisional Application No. 60/803,715, filed on Jun. 2, 2006, which are incorporated herein by reference in their entireties.

The invention relates to the use of 5-acetyl-2,5-dimethyl-2-hydroxy-tetrahydrofuran-3-one (diacetyl dimer of formula (I)) (i) for imparting, intensifying and/or modifying a creamy and/or fatty sensation in the mouth, and/or (ii) for imparting, intensifying and/or modifying a sweet, buttery, cream-like and/or creamy flavour and/or (iii) as an aromatic and/or flavouring substance according to the claims. A further aspect of the invention relates to a process (i) for imparting, intensifying and/or modifying a creamy and/or fatty sensation in the mouth, and/or (ii) for imparting, intensifying and/or modifying a sweet, buttery, cream-like and/or creamy flavour, using 5-acetyl-2,5-dimethyl-2-hydroxy-tetrahydrofuran-3-one according the claims. A still further aspect of the present invention relates to an aromatic and/or flavouring composition, comprising (a) a sensorially active amount of 5-acetyl-2,5-dimethyl-2-hydroxy-tetrahydrofuran-3-one (diacetyl dimer of formula (I)) and (b) one, two or more aromatic and/or flavouring substances according to the claims. Another aspect of the present invention relates to a formulation selected from a nutrition formulation (foodstuff), an oral hygiene formulation, a luxury product, an oral pharmaceutical formulation or a semi-finished good for the preparation of nutrition formulations or luxury product, comprising 5-acetyl-2,5-dimethyl-2-hydroxy-tetrahydrofuran-3-one (diacetyl dimer of formula (I)) according to the claims. Another aspect of the present invention is related to a preparation comprising one or more compositions according to the claims, or one or more formulations according to the claims.

In the context of this invention, the term diacetyl dimer of formula (I) is understood as meaning a stereoisomer of 5-acetyl-2,5-dimethyl-2-hydroxy-tetrahydrofuran-3-one or a mixture containing or consisting of two, three or four of its stereoisomers, unless stated otherwise. The aromatic substance diacetyl (2,3-butanedione) is employed for flavouring of foodstuffs and/or compositions for consumption for pleasure which have a high fat content and taste of butter, such as e.g. margarines, formulations for the preparation of popcorn, sweet and salty baked goods. In this context, some or the total amount of the butter in the abovementioned formulations can be replaced by fats or oils which are cheaper and/or more favourable from the point of view of nutrition physiology, without influencing the desired butter flavour. Nevertheless, diacetyl is highly volatile and can therefore readily evaporate, especially in formulation processes which are accompanied by the action of heat, and can thus adversely influence the aroma and/or flavour of the finished product.

EP 0 293 957 (corresponding to U.S. Pat. No. 4,889,736) discloses the use of precursor molecules of diacetyl, a "diacetyl dimer" of the following formula D:

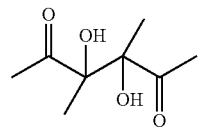

and an oligomerization product of diacetyl having 10 carbon atoms of the following formula:

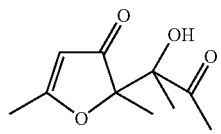

The precursor molecule of formula D and the oligomerization product described above are destroyed by the action of heat and by spontaneous decomposition and thereby release diacetyl as an aromatic and/or flavouring substance. An aroma and/or flavour impression of the precursor of formula D or the oligomerization product which differ from diacetyl is not described. A disadvantage of the use of a precursor of formula D or the oligomerization product is that typically certain amounts thereof remain after reaction in the formulation and the formulation shows fundamental disadvantages caused by the remaining precursor of formula D or the oligomerization product, whereas diacetyl, which is formed directly, is the sole constituent having an aromatizing or flavouring action in the formulation.

During the reduction of the fat and/or oil content in foodstuffs, which is desirable from the point of view of nutrition physiology, the typical pleasantly creamy, fatty sensation in the mouth is lost. This sensation in the mouth cannot be compensated by aromatization and/or flavouring with diacetyl or its precursor of formula D.

The aim of the present invention was to discover one or more aromatic or flavouring substances which are capable of a) imitating the pleasantly creamy, fatty sensation in the mouth of high-fat products in low-fat products and at the same time b) causing a buttery aroma and/or flavour impression.

The invention therefore provides the use of 5-acetyl-2,5-dimethyl-2-hydroxy-tetrahydrofuran-3-one (diacetyl dimer of formula (I)) in the form of one of its stereoisomers or in the form of a mixture consisting of or containing two, three or four of its stereoisomers

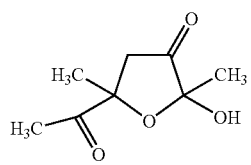

(i) for imparting, intensifying and/or modifying a creamy and/or fatty sensation in the mouth, (ii) for imparting, intensifying and/or modifying a sweet, buttery, cream-like and/or creamy flavour, and/or (iii) as an aromatic and/or flavouring substance.

In the context of this invention the terms "aroma" or "aromatic substance" are understood as meaning a substance having olfactory properties, e.g. any property detected by the olfactory system. The term "aroma" or "aromatic" can be used in the context of the present invention interchangeably with "odour" or "odoriferous", as an odour is the object of perception of the sense of olfaction (smell).

In the context of this invention the terms "flavour" or "flavouring substances" are understood as meaning a substance having a sensory impression of a food or another substance. The sensation detected by the chemical senses of taste and so-called trigeminal senses, which detect chemical irritants in the mouth and throat, can be considered as caused by "flavours" or "flavouring substances".

The terms "aroma" or "aromatic substances" on the one hand and "flavour" or "flavouring substances" on the other hand may be overlapping, as certain substances comprise aroma and flavour properties.

The diacetyl dimer of formula (I) can be in the form of a pure enantiomer and/or diastereomer or in the form of a mixture of two, three or four stereoisomers in all possible ratios. The stereoisomers of diacetyl of formula (I) are:

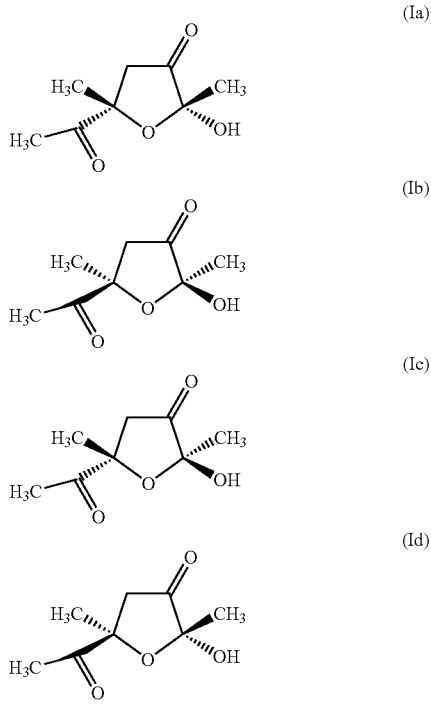

The stereoisomers in some cases differ slightly in their flavouring properties; they are indeed in some cases of different intensity, but all can in principle be used as an aromatic or flavouring substance, for imparting, intensifying and/or modifying a creamy and/or fatty sensation in the mouth, for imparting, intensifying and/or modifying a sweet, buttery, cream-like and/or creamy flavour.

It is surprising and not foreseeable for a person skilled in the art that the diacetyl dimer of formula (I) (or one of its stereoisomers and/or a mixture consisting of or containing two or more of the stereoisomers) causes a very pleasantly soft, buttery flavour when tasted, but does not thereby cause an unpleasantly sharp and/or burning ortho- or retronasal smell impression like diacetyl. In particular, the pleasantly creamy, fatty sensation in the mouth (usually caused above all by fats and/or oils) is also perceived to a high degree at a low dosage of the diacetyl dimer of formula (I), even if these fats and/or oils are absent. The diacetyl dimer of formula (I) also shows a markedly sweetness-intensifying effect, in particular also in low-fat formulations, and compared with diacetyl has a high adhesion. Furthermore, diacetyl dimer of formula (I) is not very volatile and does not decompose even when heated at 60° C. to 100° C. for 10 minutes, or at least does so only in insignificant amount that the characteristic flavour of the diacetyl dimer of formula (I) and its characteristic actions which differ from diacetyl are not lost. The diacetyl dimer of formula (I) in addition shows good stability in most nutrition formulations, oral hygiene formulations or luxury product or oral pharmaceutical formulations, and is significantly more stable than diacetyl in these formulations, in particular formulations having an acidic or basic pH-value.

The compound of formula 5-acetyl-2,5-dimethyl-2-hydroxy-tetrahydrofuran-3-one (diacetyl dimer of formula (I)) is preferably used in a "sensorially active amount".

In particular in the context of this invention the term "sensorially active amount" of 5-acetyl-2,5-dimethyl-2-hydroxy-tetrahydrofuran-3-one is present if 5-acetyl-2,5-dimethyl-2-hydroxy-tetrahydrofuran-3-one or one of its stereoisomers or a mixture consisting of or containing two, three or four of its stereoisomers can be detected by a person skilled in the art (i) as imparting, intensifying and/or modifying a creamy and/or fatty sensation in the mouth, (ii) as imparting, intensifying and/or modifying a sweet, buttery, cream-like and/or creamy flavour, and/or (iii) as an aromatic and/or flavouring substance.

The diacetyl dimer of formula (I) to be used according to the invention is known as such. The synthesis of diacetyl dimer of formula (I) starting from diacetyl in the presence of alkali has been described by Diels et al. in Chem. Ber. 1914, 47, 2355-2365 and by Birch et al. in J. Chem. Soc. 1957, 412-414.

Investigations of the stereoisomerism of diacetyl dimer of formula (I) are described in Heterocycles 1996, 43, 2125-2129.

U.S. Pat. No. 3,980,675 describes the use of diacetyl dimer of formula (I) as starting material for the preparation of 2,5-dimethyl-3(2H)-furanone, which is known in the state of the art to have a roast coffee aroma.

U.S. Pat. No. 4,096,158 and U.S. Pat. No. 4,092,334 describe a process for preparing 5-acyl-2-(fufurylthio)dihydro-2,5-dialkyl-3(2H)-furanones. Diacetyl dimer of formula (I) was prepared starting from diacetyl, the subsequent reaction of diacetyl dimer of formula (I) with furfuryl mercaptan yielded 5-acetyl-2-(fufurylthio)dihydro-2,5-dimethyl-3(2H)-furanone.

U.S. Pat. No. 4,092,333 describes processes for preparing 2-acyl-5-substituted thiatetrahydrofuran-4-ones starting from diacetyl dimer of formula (I).

The diacetyl dimer of formula (I) further was described as an intermediate product in Synthesis 1977, 754-755.

However, there are no indications in the literature of a possible use of diacetyl dimer of formula (I) as an aromatic and/or flavouring substance or a possible use of diacetyl dimer of formula (I) in aromatic compositions or formulations selected from a nutrition formulation (foodstuff), an oral hygiene formulation, a luxury product, a oral pharmaceutical formulation or a semi-finished good for the preparation of nutrition formulations or luxury products, or preparations comprising one or more of said compositions or formulations.

The preferred use of 5-acetyl-2,5-dimethyl-2-hydroxy-tetrahydrofuran-3-one as described hereinbefore is directed to a combination of 5-acetyl-2,5-dimethyl-2-hydroxy-tetrahydrofuran-3-one with one, two, three, four, five, six, seven, eight, nine, ten or more aromatic and/or flavouring substances different from 5-acetyl-2,5-dimethyl-2-hydroxy-tetrahydrofuran-3-one. Even more preferred is the use of 5-acetyl-2,5-dimethyl-2-hydroxy-tetrahydrofuran-3-one in combination with three or more, more preferred with five or more aromatic and/or flavouring substances different from 5-acetyl-2,5-dimethyl-2-hydroxy-tetrahydrofuran-3-one.

A more preferred use of 5-acetyl-2,5-dimethyl-2-hydroxy-tetrahydrofuran-3-one as described hereinbefore is directed to a combination of 5-acetyl-2,5-dimethyl-2-hydroxy-tetrahydrofuran-3-one with 2,5-diacetyl-3a,5,6,6a-tetrahydro-6a-hydroxy-2,3a,5-trimethylfuro[2,3-d]-1,3-dioxole (diacetyl trimer of formula (II))

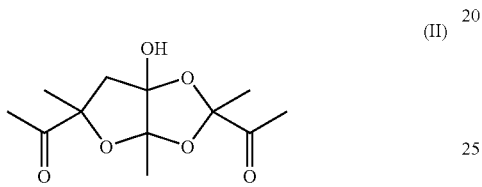
(II)

in the form of one of its stereoisomers or in the form of a mixture consisting of or containing two or more of its stereoisomers as the or as one of the aromatic or flavouring substances.

In a preferred aspect the aromatic and/or flavouring substance, in particular diacetyl trimer of formula (II), is present in a "sensorially active amount". In particular in the context of this invention the term "sensorially active amount" of 2,5-diacetyl-3a,5,6,6a-tetrahydro-6a-hydroxy-2,3a,5-trimethylfuro[2,3-d]-1,3-dioxole is present if 2,5-diacetyl-3a,5,6,6a-tetrahydro-6a-hydroxy-2,3a,5-trimethylfuro[2,3-d]-1,3-dioxole or one of its stereoisomers or a mixture consisting of or containing two or more of its stereoisomers used in the present invention can be detected by a person skilled in the art
 (i) as imparting, intensifying and/or modifying a creamy and/or fatty sensation in the mouth,
 (ii) as imparting, intensifying and/or modifying a sweet, buttery, cream-like and/or creamy flavour,
 (iii) as masking a bitter flavour and/or
 (iv) as an aromatic and/or flavouring substance.

The diacetyl trimer of formula (II) to be used according to this invention can be in the form of a pure enantiomer and/or diastereomer or in the form of a mixture in all possible ratios. The stereoisomers of diacetyl trimer are:

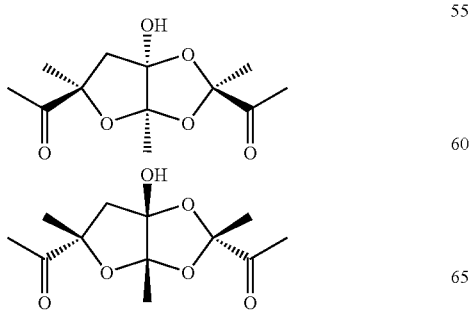

-continued

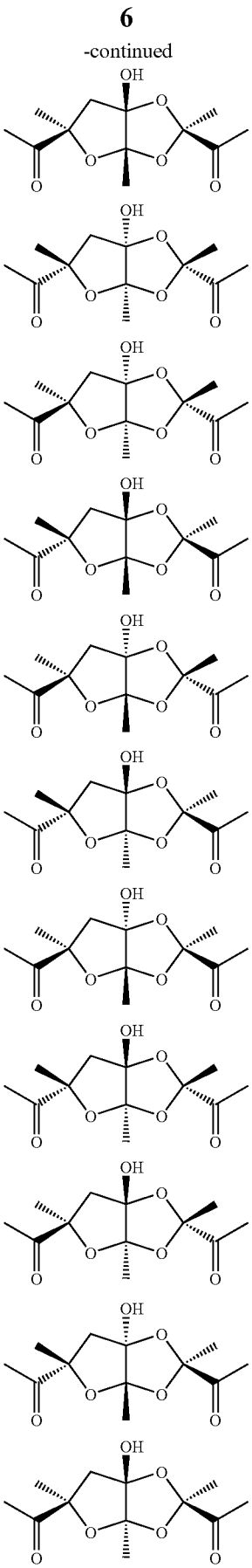

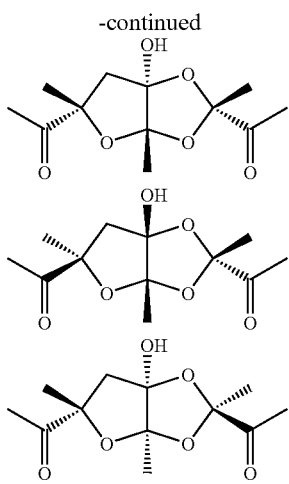

The stereoisomers in some cases differ slightly in their flavouring properties; they are indeed in some cases of different intensity, but all can in principle be used as an aromatic and/or flavouring substance, for imparting, intensifying and/or modifying a creamy and/or fatty sensation in the mouth, for imparting, intensifying and/or modifying a sweet, buttery, cream-like and/or creamy flavour, and/or for masking a bitter flavour.

Thus in the context of this invention the term "diacetyl trimer of formula (II)" is understood as meaning a stereoisomer of 2,5-diacetyl-3a,5,6,6a-tetrahydro-6a-hydroxy-2,3a,5-trimethylfuro[2,3-d]-1,3-dioxole or a mixture containing or consisting of two or more of its stereoisomers, unless stated otherwise.

Diacetyl trimer of formula (II) or one of its stereoisomers and/or a mixture consisting of or containing two or more of its stereoisomers causes a very pleasantly soft, buttery flavour when tasted, but does not thereby cause an unpleasantly sharp and/or burning ortho- or retronasal smell impression like diacetyl. In particular, the pleasantly creamy, fatty sensation in the mouth (usually caused above all by fats and/or oils) is also perceived to a high degree at a low dosage of the diacetyl trimer of formula (II), even if these fats and/or oils are absent. The diacetyl trimer of formula (II) also shows a markedly sweetness-intensifying and a bitterness-masking effect, in particular also in low-fat formulations, and compared with diacetyl has a high adhesion. Furthermore, diacetyl trimer of formula (II) is not very volatile and does not decompose even when heated at 60° C. to 100° C. for 10 minutes, or at least does so only so insignificantly that the characteristic flavour of the diacetyl trimer of formula (II) and its characteristic actions which differ from diacetyl are not lost.

Thus, a further aspect of the invention provides the use of 2,5-diacetyl-3a,5,6,6a-tetrahydro-6a-hydroxy-2,3a,5-trimethylfuro[2,3-d]-1,3-dioxole (diacetyl trimer of formula (II))

(II)

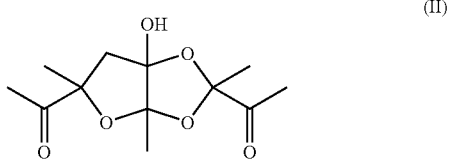

in the form of one of its stereoisomers or in the form of a mixture consisting of or containing two or more of its stereoisomers (i) for imparting, intensifying and/or modifying a creamy and/or fatty sensation in the mouth, (ii) for imparting, intensifying and/or modifying a sweet, buttery, cream-like and/or creamy flavour, (iii) for masking a bitter flavour and/or (iv) as an aromatic and/or flavouring substance.

Even more preferred is the use of 2,5-diacetyl-3a,5,6,6a-tetrahydro-6a-hydroxy-2,3a,5-trimethylfuro[2,3-d]-1,3-dioxole (diacetyl trimer of formula (II)) in combination with three or more, more preferred with five or more aromatic and/or flavouring substances different from 2,5-diacetyl-3a,5,6,6a-tetrahydro-6a-hydroxy-2,3a,5-trimethylfuro[2,3-d]-1,3-dioxole (diacetyl trimer of formula (II)).

A still further aspect of this invention provides a process (i) for imparting, intensifying and/or modifying a creamy and/or fatty sensation in the mouth, (ii) for imparting, intensifying and/or modifying a sweet, buttery, cream-like and/or creamy flavour and/or (iii) for masking a bitter flavour, with the steps:

a) provision of 2,5-diacetyl-3a,5,6,6a-tetrahydro-6a-hydroxy-2,3a,5-trimethylfuro[2,3-d]-1,3-dioxole (diacetyl trimer of formula (II)) or a mixture comprising 2,5-diacetyl-3a,5,6,6a-tetrahydro-6a-hydroxy-2,3a,5-trimethylfuro[2,3-d]-1,3-dioxole, wherein the 2,5-diacetyl-3a,5,6,6a-tetrahydro-6a-hydroxy-2,3a,5-trimethylfuro[2,3-d]-1,3-dioxole is in the form of one of its stereoisomers or in the form of a mixture consisting of two, three or four of its stereoisomers; and b) bringing into contact or mixing of
2,5-diacetyl-3a,5,6,6a-tetrahydro-6a-hydroxy-2,3a,5-trimethylfuro[2,3-d]-1,3-dioxole or the mixture thereof provided in step a), wherein 2,5-diacetyl-3a,5,6,6a-tetrahydro-6a-hydroxy-2,3a,5-trimethylfuro[2,3-d]-1,3-dioxole is respectively present in a sensorially active amount, with
a substance optionally comprising one, two, three, four, five, six, seven, eight, nine, ten or more aromatic and/or flavouring substances different from 2,5-diacetyl-3a,5,6,6a-tetrahydro-6a-hydroxy-2,3a,5-trimethylfuro[2,3-d]-1,3-dioxole.

A still further aspect of the present invention provides an aromatic and/or flavouring composition, comprising as components:

(a) a sensorially active amount of 2,5-diacetyl-3a,5,6,6a-tetrahydro-6a-hydroxy-2,3a,5-trimethylfuro[2,3-d]-1,3-dioxole (diacetyl trimer of formula (II)) in the form of one of its stereoisomers or in the form of a mixture consisting of or containing two, three or four of its stereoisomers, and (b) one, two, three, four, five, six, seven, eight, nine, ten or more aromatic and/or flavouring substances different from 2,5-diacetyl-3a,5,6,6a-tetrahydro-6a-hydroxy-2,3a,5-trimethylfuro[2,3-d]-1,3-dioxole (diacetyl trimer of formula (II)), with the proviso, that the aromatic and/or flavouring composition is not a composition comprising:
2,5-diacetyl-3a,5,6,6a-tetrahydro-6a-hydroxy-2,3a,5-trimethylfuro[2,3-d]-1,3-dioxole (diacetyl trimer of formula (II)) and (i) one or more hydroxides of an alkaline metal and/or (ii) one or more anion-exchange resins and/or (iii) alkalinised powdered glass but no further aromatic and/or flavouring substances,
2,5-diacetyl-3a,5,6,6a-tetrahydro-6a-hydroxy-2,3a,5-trimethylfuro[2,3-d]-1,3-dioxole (diacetyl trimer of formula (II)) and diacetyl but no further aromatic and/or flavouring substance.

An aromatic and/or flavouring composition as described hereinbefore does preferably not contain diacetyl and/or any hydroxides of alkaline metals and/or any anion-exchange resins and/or any alkalinised powdered glass.

Preferably the pH-values of aromatic and/or flavouring compositions as described hereinbefore are pH≦10, preferably between 4≦pH≦8.5, more preferably between 6≦pH≦8.

A still further aspect of the present invention provides an aromatic and/or flavouring composition, comprising or consisting of
   a) a sensorially active amount of 2,5-diacetyl-3a,5,6,6a-tetrahydro-6a-hydroxy-2,3a,5-trimethylfuro[2,3-d]-1,3-dioxole (diacetyl trimer of formula (II)) in the form of one of its stereoisomers or in the form of a mixture comprising consisting of two, three or four of its stereoisomers; and
   b) (a sensorially active amount of) 5-acetyl-2,5-dimethyl-2-hydroxy-tetrahydrofuran-3-one (diacetyl dimer of formula (I)) in the form of one of its stereoisomers or in the form of a mixture comprising or consisting of two, three or four of its stereoisomers.

Preferably, an aromatic and/or flavouring composition as described hereinbefore, does not contain any hydroxides of (earth) alkaline metals, in particular NaOH and/or KOH, and/or sulphuric acid, and/or diacetyl, and/or 2,5-dimethyl-3-(2H)-furanone.

Such a composition is obtainable and preferably produced by conversion of diacetyl with the aid/in the presence of alkaline (basic) earth alkali metal salt (i.e. having a pH-value above 7 in aqueous media), and subsequent removal of said earth alkali metal salt. Preferably the earth salt is selected from the group consisting of earth alkali metal oxides, hydroxides, carbonates or hydrogencarbonates. Preferred earth alkali metals are Mg and Ca. More preferred are Ca-oxide, Mg-oxide, Ca-hydroxide, Mg-hydroxide, Ca-carbonate, Mg-carbonate, Ca-hydrogencarbonate, Mg-hydrogencarbonate and mixtures thereof. Natural occurring materials like e.g. marble powder, can advantageously also be used as earth alkali metal salt.

Preferably the total weight ratio of a) diacetyl trimer of formula (II) and b) diacetyl dimer of formula (I) is in the range of 10:1 to 1:10, more preferred in the range of 5:1 to 1:5.

A further aspect of the present invention provides formulation selected from a nutrition formulation (foodstuff), an oral hygiene formulation, a luxury product, oral pharmaceutical formulation or a semi-finished good for the preparation of nutrition formulations or luxury product, comprising as components:
   (a) a sensorially active amount of 2,5-diacetyl-3a,5,6,6a-tetrahydro-6a-hydroxy-2,3a,5-trimethylfuro[2,3-d]-1,3-dioxole (diacetyl trimer of formula (II)) in the form of one of its stereoisomers or in the form of a mixture consisting of or containing two, three or four of its stereoisomers
or
   (b) an aromatic and/or flavouring composition as described hereinbefore
and
   (c) conventional base substances, auxiliary substances and additives for said formulations.

Preferably, the pH-values of said formulations as described hereinbefore are pH≦8.5, preferably between 2≦pH≦8.

A still further aspect of the present invention provides a preparation comprising one or more compositions as described hereinbefore, or one or more formulations as described herein before, wherein said composition or formulation is dissolved, dispersed, embedded and/or encapsulated on and/or in a carrier.

In particular the carrier can be present in solid or liquid form.

In particular the pH-values of said preparations as described hereinbefore are pH≦8.5, preferably between 2≦pH≦8.

The invention further provides a process (i) for imparting, intensifying and/or modifying a creamy and/or fatty sensation in the mouth, and/or (ii) for imparting, intensifying and/or modifying a sweet, buttery, cream-like and/or creamy flavour, with the steps:
   a) provision of 5-acetyl-2,5-dimethyl-2-hydroxy-tetrahydrofuran-3-one (diacetyl dimer of formula (I)) or a mixture comprising 5-acetyl-2,5-dimethyl-2-hydroxy-tetrahydrofuran-3-one, wherein the 5-acetyl-2,5-dimethyl-2-hydroxy-tetrahydrofuran-3-one is in the form of one of its stereoisomers or in the form of a mixture consisting of two, three or four of its stereoisomers; and
   c) bringing into contact or mixing of
      5-acetyl-2,5-dimethyl-2-hydroxy-tetrahydrofuran-3-one or the mixture thereof provided in step a), wherein 5-acetyl-2,5-dimethyl-2-hydroxy-tetrahydrofuran-3-one is respectively present in a sensorially active amount, with
      a substance optionally comprising one, two, three, four, five, six, seven, eight, nine, ten or more aromatic and/or flavouring substances different from 5-acetyl-2,5-dimethyl-2-hydroxy-tetrahydrofuran-3-one.

A preferred process as described hereinbefore is directed to a process, wherein
   the mixture of 5-acetyl-2,5-dimethyl-2-hydroxy-tetrahydrofuran-3-one in step a) comprises 5-acetyl-2,5-dimethyl-2-hydroxy-tetrahydrofuran-3-one and 2,5-diacetyl-3a,5,6,6a-tetrahydro-6a-hydroxy-2,3a,5-trimethylfuro[2,3-d]-1,3-dioxole (diacetyl trimer of formula (II)), wherein 5-acetyl-2,5-dimethyl-2-hydroxy-tetrahydrofuran-3-one and 2,5-diacetyl-3a,5,6,6a-tetrahydro-6a-hydroxy-2,3a,5-trimethylfuro[2,3-d]-1,3-dioxole independently from each other are in the form of one of their stereoisomers or in the form of a mixture consisting of or containing two or more of the respective stereoisomers,
or
   the substance of step b) comprises as the or as one of the aromatic or flavouring substances 2,5-diacetyl-3a,5,6,6a-tetrahydro-6a-hydroxy-2,3a,5-trimethylfuro[2,3-d]-1,3-dioxole (diacetyl trimer of formula (II)) in the form of one of its stereoisomers or in the form of a mixture consisting of or containing two or more of its stereoisomers.

A further aspect of the present invention relates to an aromatic and/or flavouring composition, comprising
   (a) a sensorially active amount of 5-acetyl-2,5-dimethyl-2-hydroxy-tetrahydrofuran-3-one (diacetyl dimer of formula (I)) in the form of
one of its stereoisomers or in the form of a mixture consisting of or containing two, three or four of its stereoisomers, and one, two, three, four, five, six, seven, eight, nine, ten or more aromatic and/or flavouring substances different from 5-acetyl-2,5-dimethyl-2-hydroxy-tetrahydrofuran-3-one (diacetyl dimer of formula (I)),
with the proviso that the aromatic and/or flavouring composition is not a composition comprising:
   5-acetyl-2,5-dimethyl-2-hydroxy-tetrahydrofuran-3-one (diacetyl dimer of formula (I)) and (i) one or more hydroxides of an alkaline metal selected from NaOH and KOH, or (ii) sulfuric acid, but no further aromatic and/or flavouring substances, or 5-acetyl-2,5-dimethyl-2-hydroxy-tetrahydrofuran-3-one (diacetyl dimer of formula (I)), and (i) diacetyl or (ii) 2,5-dimethyl-3-(2H)-furanone, but no further aromatic and/flavouring substance, and in particular is not a composition comprising:

5-acetyl-2,5-dimethyl-2-hydroxy-tetrahydrofuran-3-one (diacetyl dimer of formula (I)) and (i) diacetyl or (ii) 2,5-dimethyl-3-(2H)-furanone, but no further aromatic and/flavouring substance, and a hydroxide of an alkaline metal.

Preferably, an aromatic and/or flavouring composition as described hereinbefore, does not contain any hydroxides of alkaline metals, in particular NaOH and/or KOH, and/or sulphuric acid, and/or diacetyl, and/or 2,5-dimethyl-3-(2H)-furanone.

A preferred embodiment of the present invention is an aromatic and/or flavouring composition, wherein component (b) comprises 2,5-diacetyl-3a,5,6,6a-tetrahydro-6a-hydroxy-2,3a,5-trimethylfuro[2,3-d]-1,3-dioxole (diacetyl trimer of formula (II)) in the form of one of its stereoisomers or in the form of a mixture consisting of or containing two or more of its stereoisomers as the or as one of the aromatic or flavouring substances.

In a still preferred embodiment of the present invention 2,5-diacetyl-3a,5,6,6a-tetrahydro-6a-hydroxy-2,3a,5-trimethylfuro[2,3-d]-1,3-dioxole (diacetyl trimer of formula (II)) is present in a sensorially active amount.

In particular the pH-values of aromatic and/or flavouring compositions as described hereinbefore are pH≦10, preferably between 4≦pH≦8,5, more preferably between 6≦pH≦8.

A still further aspect of the present invention is related to a formulation selected from a nutrition formulation (foodstuff), an oral hygiene formulation, a luxury product formulation, a formulation for oral pharmaceutical use or a semi-finished good formulation for the preparation of nutrition formulations or luxury product formulations, comprising as components:

(a) a sensorially active amount of 5-acetyl-2,5-dimethyl-2-hydroxy-tetrahydrofuran-3-one (diacetyl dimer of formula (I)) in the form of one of its stereoisomers or in the form of a mixture consisting of or containing two, three or four of its stereoisomers or (b) an aromatic and/or flavouring composition as described hereinbefore and (c) conventional base substances, auxiliary substances and additives for said formulations.

In particular the pH-values of said formulations as described hereinbefore are pH≦8,5, preferably between 2≦pH≦8.

A further aspect of the present invention is directed to a preparation comprising one or more compositions as described hereinbefore, or one or more formulations as described hereinbefore, wherein said composition or formulation is dissolved, dispersed, embedded and/or encapsulated on and/or in a carrier.

In particular the carrier can be present in solid or liquid form.

In particular the pH-values of said preparations as described hereinbefore are pH≦8,5, preferably between 2≦pH≦8.

Such compositions, formulations and preparations can utilize the advantageous actions of diacetyl dimer of formula (I) and/or diacetyl trimer of formula (II), which are described hereinbefore. For this, diacetyl dimer of formula (I) and/or diacetyl trimer of formula (II) are expediently employed respectively in an sensorially active amount for achieving a (i) pleasantly creamy, fatty sensation in the mouth and/or (ii) for intensifying the flavour of fats and/or oils and/or for imitating the flavour of fats and/or oils.

A particular advantage of such compositions, formulations and preparations in the context of this invention is that the amount of fats and/or oils in these formulations can be reduced compared with formulations which do not contain diacetyl dimer of formula (I) and/or diacetyl trimer of formula (II) in a respective sensorially active amount, but are otherwise identical, or such fats and/or oils can even be dispensed with entirely.

A particular further advantage of such compositions, formulations and preparations in the context of this invention is that the content of other sweeteners in these formulations can be reduced compared with compositions, formulations and preparations which do not contain diacetyl dimer of formula (I) and/or diacetyl trimer of formula (II) in a respective sensorially active amount, but are otherwise identical.

A particularly rounded-off sensorial profile in the context of this invention can be achieved by using diacetyl dimer of formula (I) and/or diacetyl trimer of formula (II) together with one or more aromatic and/or flavouring substances in appropriate compositions, formulations or preparations as described hereinbefore. In this respect in particular interesting and inventive aroma and/or flavour notes can be achieved.

Preferred aromatic substances (odoriferous substances) in the context of this invention can be found in e.g. S. Arctander, Perfume and Flavor Materials, Vol. I and II, Montclair, N.J. 1969, Eigenverlag, oder K. Bauer et al., Common Fragrance and Flavor Materials, 4th Edition, Wiley-VCH, Weinheim 2001.

In particular the following aromatic substances are preferably used in combination with diacetyl dimer of formula (I) and/or diacetyl trimer of formula (II):

extracts from natural raw materials such as essential oils, concretes, absolutes, resins, resinoids, balsams, tinctures, such as, for example, ambergris tincture; amyris oil; angelica seed oil; angelica root oil; aniseed oil; valerian oil; basil oil; wood moss absolute; bay oil; mugwort oil; benzoin resin; bergamot oil; beeswax absolute; birch tar oil; bitter almond oil; savory oil; bucco leaf oil; cabreuva oil; cade oil; calmus oil; camphor oil; cananga oil; cardamom oil; cascarilla oil; *cassia* oil; *cassia* absolute; castoreum absolute; cedar leaf oil; cedarwood oil; cistus oil; citronella oil; lemon oil; copaiva balsam; copaiva balsam oil; coriander oil; *costus* root oil; cumin oil; cypress oil; davana oil; dill herb oil; dill seed oil; eau de brouts absolute; oakmoss absolute; elemi oil; estragon oil; eucalyptus citriodora oil; eucalyptus oil; fennel oil; spruce needle oil; galbanum oil; galbanum resin; geranium oil; grapefruit oil; guaiac wood oil; gurjun balsam; gurjun balsam oil; *helichrysum* absolute; *helichrysum* oil; ginger oil; iris root absolute; iris root oil; jasmine absolute; calamus oil; blue camomile oil; Roman camomile oil; carrot seed oil; cascarilla oil; pine needle oil; spearmint oil; caraway oil; labdanum oil; labdanum absolute; labdanum resin; lavandin absolute; lavandin oil; lavender absolute; lavender oil; lemongrass oil; lovage oil; distilled lime oil; pressed lime oil; linaloe oil; litsea cubeba oil; bayleaf oil; mace oil; marjoram oil; mandarin oil; massoi bark oil; mimosa absolute; musk seed oil; musk tincture; clary sage oil; nutmeg oil; myrrh absolute; myrrh oil; myrtle oil; clove leaf oil; clove flower oil; neroli oil; olibanum absolute; olibanum oil; opopanax oil; orange-flower absolute; orange oil; *origanum* oil; palmarosa oil; patchouli oil; *perilla* oil; Peruvian balsam oil; parsley leaf oil; parsley seed oil; petitgrain oil; peppermint oil; pepper oil;

pimento oil; pine oil; pennyroyal oil; rose absolute; rosewood oil; rose oil; rosemary oil; Dalmation sage oil; Spanish sage oil; sandalwood oil; celery seed oil; spike lavender oil; Japanese anise oil; *styrax* oil; tagetes oil; fir needle oil; tea-tree oil; turpentine oil; thyme oil; Tolu balsam; tonka absolute; tuberose absolute; vanilla extract; violet leaf absolute; verbena oil; vetiver oil; juniper oil; wine lees oil; absinthe oil; wintergreen oil; ylang oil; hyssop oil; civet absolute; cinnamon leaf oil; cinnamon bark oil; and fractions thereof, or ingredients isolated therefrom;

individual fragrances from the group of hydrocarbons, such as, for example, 3-carene; α-pinene; β-pinene; a-terpinene; γ-terpinene; p-cymene; bisabolene; camphene; caryophyllene; cedrene; farnesene; limonene; longifolene; myrcene; ocimene; valencene; (E,Z)-1,3,5-undecatriene;

of aliphatic alcohols, such as, for example, hexanol; octanol; 3-octanol; 2,6-dimethylheptanol; 2-methylheptanol, 2-methyloctanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methyleneheptan-2-ol; (E,Z)-2,6-nonadienol; 3,7-dimethyl-7-methoxyoctan-2-ol; 9-decenol; 10-undecenol; 4-methyl-3-decen-5-ol; of aliphatic aldehydes and 1,4-dioxacycloalken-2-ones thereof, such as, for example, hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanal diethyl acetal; 1,1-dimethoxy-2,2,5-trimethyl-4-hexene; citronellyl oxyacetaldehyde;

of aliphatic ketones and oximes thereof, such as, for example, 2-heptanone; 2-octanone; 3-octanone; 2-nonanone; 5-methyl-3-heptanone; 5-methyl-3-heptanone oxime; 2,4,4,7-tetramethyl-6-octen-3-one; of aliphatic sulfur-containing compounds, such as, for example, 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol;

of aliphatic nitriles, such as, for example, 2-nonenenitrile; 2-tridecenenitrile; 2,12-tridecenenitrile; 3,7-dimethyl-2,6-octadienenitrile; 3,7-dimethyl-6-octenenitrile;

of aliphatic carboxylic acids and esters thereof, such as, for example, (E)- and (Z)-3-hexenyl formate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenyl isobutyrate; hexyl crotonate; ethyl isovalerate; ethyl 2-methylpentanoate; ethyl hexanoate; allyl hexanoate; ethyl heptanoate; allyl heptanoate; ethyl octanoate; ethyl (E,Z)-2,4-decadienoate; methyl 2-octynoate; methyl 2-nonynoate; allyl 2-isoamyloxyacetate; methyl 3,7-dimethyl-2,6-octadienoate;

of acyclic terpene alcohols, such as, for example, citronellol; geraniol; nerol; linalool; lavandulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol; 2,6-dimethyl-2,5,7-octatrien-1-ol; and formates, acetates, propionates, isobutyrates, butyrates, isovalerates, pentanoates, hexanoates, crotonates, tiglinates, 3-methyl-2-butenoates thereof;

of acyclic terpene aldehydes and ketones, such as, for example, geranial; neral; citronellal; 7-hydroxy-3,7-dimethyloctanal; 7-methoxy-3,7-dimethyloctanal; 2,6,10-trimethyl-9-undecenal; geranylacetone; and the dimethyl and diethyl acetals of geranial, neral, 7-hydroxy-3,7-dimethyloctanal;

of cyclic terpene alcohols, such as, for example, menthol; isopulegol; alpha-terpineol; terpineol-4; menthan-8-ol; menthan-1-ol; menthan-7-ol; borneol; isoborneol; linalool oxide; nopol; cedrol; ambrinol; vetiverol; guaiol; and formates, acetates, propionates, isobutyrates, butyrates, isovalerates, pentanoates, hexanoates, crotonates, tiglinates, 3-methyl-2-butenoates thereof;

of cyclic terpene aldehydes and ketones, such as, for example, menthone; isomenthone; 8-mercaptomenthan-3-one; carvone; camphor; fenchone; alpha-ionone; beta-ionone; alpha-n-methylionone; beta-n-methylionone; alpha-isomethylionone; beta-isomethylionone; alpha-irone; alpha-damascone; beta-damascone; beta-damascenone; delta-damascone; gamma-damascone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; nootkatone; dihydronootkatone; alpha-sinensal; beta-sinensal; acetylated cedarwood oil (methyl cedryl ketone);

of cyclic alcohols, such as, for example, 4-tert-butylcyclohexanol; 3,3,5-trimethylcyclohexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

of cycloaliphatic alcohols, such as, for example, alpha-3,3-trimethylcyclohexylmethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethylcyclohexyl)pentan-3-ol; 1-(2,2,6-trimethylcyclohexyl)hexan-3-ol;

of cyclic and cycloaliphatic ethers, such as, for example, cineol; cedryl methyl ether; cyclododecyl methyl ether; (ethoxymethoxy)cyclododecane; alpha-cedrene epoxide; 3a,6,6,9a-tetramethyldodecahydronaphtho[2,1-b]furan; 3a-ethyl-6,6,9a-trimethyldodecahydronaphtho[2,1-b]furan; 1,5,9-trimethyl-13-oxabicyclo[10.1.0]trideca-4,8-diene; rose oxide; 2-(2,4-dimethyl-3-cyclohexen-1-yl)-5-methyl-5-(1-methylpropyl)-1,3-dioxane;

of cyclic ketones, such as, for example, 4-tert-butylcyclohexanone; 2,2,5-trimethyl-5-pentylcyclopentanone; 2-heptylcyclopentanone; 2-pentylcyclopentanone; 2-hydroxy-3-methyl-2-cyclopenten-1-one; 3-methyl-cis-2-penten-1-yl-2-cyclopenten-1-one; 3-methyl-2-pentyl-2-cyclopenten-1-one; 3-methyl-4-cyclopentadecenone; 3-methyl-5-cyclopentadecenone; 3-methylcyclopentadecanone; 4-(1-ethoxyvinyl)-3,3,5,5-tetramethylcyclohexanone; 4-tert-pentylcyclohexanone; 5-cyclohexadecen-1-one; 6,7-dihydro-1,1,2,3,3-pentamethyl-4(5H)-indanone; 5-cyclohexadecen-1-one; 8-cyclohexadecen-1-one; 9-cycloheptadecen-1-one; cyclopentadecanone;

of cycloaliphatic aldehydes, such as, for example, 2,4-dimethyl-3-cyclohexenecarbaldehyde; 2-methyl-4-(2,2,6-trimethyl-cyclohexen-1-yl)-2-butenal; 4-(4-hydroxy-4-methyl-pentyl)-3-cyclohexenecarbaldehyde; 4-(4-methyl-3-penten-1-yl)-3-cyclohexenecarbaldehyde;

of cycloaliphatic ketones, such as, for example, 1-(3,3-dimethylcyclohexyl)-4-penten-1-one; 1-(5,5-dimethyl-1-cyclohexen-1-yl)-4-penten-1-one; 2,3,8,8-tetramethyl-1,2,3,4,5,6,7,8-octahydro-2-naphthalenyl methyl ketone; methyl-2,6,10-trimethyl-2,5,9-cyclododecatrienyl ketone; tert-butyl 2,4-dimethyl-3-cyclohexen-1-yl ketone;

of esters of cyclic alcohols, such as, for example, 2-tert-butylcyclohexyl acetate; 4-tert-butylcyclohexyl acetate; 2-tert-pentylcyclohexyl acetate; 4-tert-pentylcyclohexyl acetate; decahydro-2-naphthyl acetate; 3-pentyltetrahydro-2H-pyran-4-yl acetate; decahydro-2,5,5,8a-tetramethyl-2-naphthyl acetate; 4,7-methano-3a,4,5,6,7,7a-hexahydro-5 or 6-indenyl acetate; 4,7-methano-3a,4,5,6,7,7a-hexahydro-5 or 6-indenyl propionate; 4,7-methano-3a,4,5,6,7,7a-hexahydro-5 or 6-indenyl isobutyrate; 4,7-methanooctahydro-5 or 6-indenyl acetate;

of esters of cycloaliphatic carboxylic acids, such as, for example, allyl 3-cyclohexyl-propionate; allyl cyclohexyloxyacetate; methyl dihydrojasmonate; methyl jasmonate; methyl 2-hexyl-3-oxocyclopentanecarboxylate; ethyl 2-ethyl-6,6-dimethyl-2-cyclohexenecarboxylate; ethyl 2,3,6,6-tetramethyl-2-cyclohexenecarboxylate; ethyl 2-methyl-1,3-dioxolan-2-acetate;

of aromatic hydrocarbons, such as, for example, styrene and diphenylmethane;

of araliphatic alcohols, such as, for example, benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

of esters of araliphatic alcohols and aliphatic carboxylic acids, such as, for example, benzyl acetate; benzyl propionate; benzyl isobutyrate; benzyl isovalerate; 2-phenylethyl acetate; 2-phenylethyl propionate; 2-phenylethyl isobutyrate; 2-phenylethyl isovalerate; 1-phenylethyl acetate; alpha-trichloromethylbenzyl acetate; alpha,alpha-dimethylphenylethyl acetate; alpha,alpha-dimethylphenylethyl butyrate; cinnamyl acetate; 2-phenoxyethyl isobutyrate; 4-methoxybenzyl acetate; of araliphatic ethers, such as, for example, 2-phenylethyl methyl ether; 2-phenylethyl isoamyl ether; 2-phenylethyl 1-ethoxyethyl ether; phenylacetaldehyde dimethyl acetal; phenylacetaldehyde diethyl acetal; hydratropaldehyde dimethyl acetal; phenylacetaldehyde glycerol acetal; 2,4,6-trimethyl-4-phenyl-1,3-dioxane; 4,4a,5,9b-tetrahydroindeno[1,2-d]-m-dioxin; 4,4a,5,9b-tetrahydro-2,4-dimethylindeno[1,2-d]-m-dioxin;

of aromatic and araliphatic aldehydes, such as, for example, benzaldehyde; phenylacetaldehyde; 3-phenylpropanal; hydratropaldehyde; 4-methylbenzaldehyde; 4-methylphenylacetaldehyde; 3-(4-ethylphenyl)-2,2-dimethylpropanal; 2-methyl-3-(4-isopropylphenyl)propanal; 2-methyl-3-(4-tert-butylphenyl)propanal; 3-(4-tert-butylphenyl)propanal; cinnamaldehyde; alpha-butylcinnamaldehyde; alpha-amylcinnamaldehyde; alpha-hexylcinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylenedioxybenzaldehyde; 3,4-dimethoxybenzaldehyde; 2-methyl-3-(4-methoxyphenyl)propanal; 2-methyl-3-(4-methylenedioxyphenyl)propanal;

of aromatic and araliphatic ketones, such as, for example, acetophenone; 4-methylacetophenone; 4-methoxyacetophenone; 4-tert-butyl-2,6-dimethylacetophenone; 4-phenyl-2-butanone; 4-(4-hydroxyphenyl)-2-butanone; 1-(2-naphthalenyl)ethanone; benzophenone; 1,1,2,3,3,6-hexamethyl-5-indanyl methyl ketone; 6-tert-butyl-1,1-dimethyl-4-indanyl methyl ketone; 1-[2,3-dihydro-1,1,2,6-tetramethyl-3-(1-methylethyl)-1H-5-indenyl]ethanone; 5',6',7',8'-tetrahydro-3',5',5',6',8',8'-hexamethyl-2-acetonaphthone;

of aromatic and araliphatic carboxylic acids and esters thereof, such as, for example, benzoic acid; phenylacetic acid; methyl benzoate; ethyl benzoate; hexyl benzoate; benzyl benzoate; methyl phenylacetate; ethyl phenylacetate; geranyl phenylacetate; phenylethyl phenylacetate; methyl cinnamate; ethyl cinnamate; benzyl cinnamate; phenylethyl cinnamate; cinnamyl cinnamate; allyl phenoxyacetate; isoamyl salicylate; hexyl salicylate; cyclohexyl salicylate; cis-3-hexenyl salicylate; benzyl salicylate; phenylethyl salicylate; methyl 2,4-dihydroxy-3,6-dimethylbenzoate; ethyl 3-phenylglycidate; ethyl 3-methyl-3-phenylglycidate;

of nitrogen-containing aromatic compounds, such as, for example, 2,4,6-trinitro-1,3-dimethyl-5-tert-butylbenzene; 3,5-dinitro-2,6-dimethyl-4-tert-butylacetophenone; cinnamonitrile; 5-phenyl-3-methyl-2-pentenenitrile; 5-phenyl-3-methylpentanenitrile; methyl anthranilate; methyl N-methylanthranilate; Schiff bases of methyl anthranilate with 7-hydroxy-3,7-dimethyloctanal, 2-methyl-3-(4-tert-butylphenyl)propanal or 2,4-dimethyl-3-cyclohexenecarbaldehyde; 6-isopropylquinoline; 6-isobutylquinoline; 6-sec-butylquinoline; indole; skatole; 2-methoxy-3-isopropylpyrazine; 2-isobutyl-3-methoxypyrazine;

of phenols, phenyl ethers and phenyl esters, such as, for example, estragole; anethole; eugenole; eugenyl methyl ether; isoeugenole; isoeugenyl methyl ether; thymol; carvacrol; diphenyl ether; beta-naphthyl methyl ether; beta-naphthyl ethyl ether; beta-naphthyl isobutyl ether; 1,4-dimethoxybenzene; eugenyl acetate; 2-methoxy-4-methylphenol; 2-ethoxy-5-(1-propenyl)phenol; p-cresyl phenylacetate;

of heterocyclic compounds, such as, for example, 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

of lactones, such as, for example, 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene 1,12-dodecanedioate; ethylene 1,13-tridecanedioate; coumarin; 2,3-dihydrocoumarin; octahydrocoumarin.

These formulations and preparations according to the invention comprise other conventional base substances, auxiliary substances and additives for foodstuffs and compositions for consumption for pleasure or formulations which serve for oral hygiene.

The formulations and preparations of the present invention as a rule comprise 0.0000001 wt. % to 1 wt. %, preferably 0.00001 to 1 wt. %, but particularly preferably 0.00001 wt. % to 0.1 wt. %, based on the total weight of the formulation, of diacetyl dimer of formula (I). Further conventional base substances, auxiliary substances and additives for foodstuffs or compositions for consumption for pleasure or formulations which serve for oral hygiene can be present in amounts of from 0.0000001 to 99.9999999 wt. %, preferably 10 to 80 wt. %, based on the total weight of the formulation. The formulations can comprise water in an amount of up to 99.9999999 wt. %, preferably 5 to 80 wt. %, based on the total weight of the formulation.

The formulations selected from a nutrition formulation (foodstuff), an oral hygiene formulation, a luxury product, an oral pharmaceutical formulation or a semi-finished good for the preparation of nutrition formulations or luxury product, or the preparations comprising compositions directed to diacetyl dimer of formula (I) or diacetyl trimer of formula (II)

as described hereinbefore or formulations directed to diacetyl dimer of formula (I) or diacetyl trimer of formula (II) as described hereinbefore are e.g. baked goods (e.g. bread, dry biscuits, cakes, other baked products), confectionery (e.g. chocolate, chocolate bar products, other bar products, fruit gum, hard and soft caramels, chewing gum), alcoholic or non-alcoholic drinks (e.g. coffee, tea, wine, wine-containing drinks, beer, beer-containing drinks, liqueurs, schnapps, brandies, fruit-containing carbonated drinks, isotonic drinks, refreshing drinks, nectars, fruit and vegetable juices, fruit or vegetable juice formulations), instant drinks (e.g. instant cocoa drinks, instant tea drinks, instant coffee drinks), meat products (e.g. ham, fresh sausage or uncooked sausage formulations, seasoned or marinated fresh or salted meat products), eggs or egg products (dried egg, egg white, egg yolk), cereal products (e.g. breakfast cereals, muesli bars, precooked ready-made rice products, puffed rice or popcorn), dairy products (e.g. milk drinks, milk ice, yoghurt, kefir, fresh cheese, soft cheese, hard cheese, dried milk powder, whey, butter, buttermilk), fruit formulations (e.g. preserves, fruit-flavoured ice-cream, fruit sauces, fruit fillings), vegetable formulations (e.g. ketchup, sauces, dried vegetables, frozen vegetables, precooked vegetables, cooked vegetables), nibbles (e.g. baked or fried potato chips or potato paste products, extrudates based on maize or peanuts), fat- or oil-based products or emulsions thereof (e.g. margarine, spreading products, mayonnaise, remoulade, dressings), other ready-made dishes and soups (e.g. dried soups, instant soups, precooked soups), spices, spice mixtures and, in particular, sprinkling spices (seasonings), which are used, for example, in the snacks sector.

The compositions, formulations or preparations in the context of the invention can also be in the form of capsules, tablets (non-coated and coated tablets, e.g. coatings which are resistant to gastric juice), lacquered tablets, granules, pellets, solid mixtures, dispersions in liquid phases, emulsions, powders, solutions, pastes or other formulations as food supplements which can be swallowed or chewed.

It has also proved to be particularly advantageous that the diacetyl dimer of formula (I) and/or diacetyl trimer of formula (II) to be used according to the invention, in particular in the preferred combination with further aromatic and/or flavouring substances, in the context of aromatizing substances and/or aromatizing plant extracts, imitate the pleasantly creamy, fatty sensation in the mouth of fats and/or oils in the formulations according to the invention, and it is therefore possible for the fat and/or oil content to be adjusted to a lower level or to be replaced completely, with the same sensorial evaluation.

Preferred oral hygiene formulations in the context of this invention are in particular dental care compositions, such as toothpastes, tooth gels, tooth powders, mouthwashes, chewing gums and other oral care compositions.

Oral pharmaceutical formulations in the context of the invention are formulations which e.g. are in the form of capsules, tablets (non-coated and coated tablets, e.g. coatings which are resistant to gastric juice), lacquered tablets, granules, pellets, solid mixtures, dispersions in liquid phases, emulsions, powders, solutions, pastes or other formulations which can be swallowed or chewed, which also comprise, in addition to diacetyl dimer of formula (I) and/or diacetyl trimer of formula (II), other pharmaceutical active compounds or active compounds which are suitable for foodstuff supplements, and are used as medicaments which are available only on prescription or are available only from pharmacies or other medicaments or as food supplements.

Other pharmaceutical active compounds or active compounds in the context of this invention which are suitable for foodstuff supplements can be e.g.: vitamins, minerals, antibiotics, bactericidal, fungicidal, antiviral, anthelmintic, antifungal or otherwise antimicrobially active compounds, agents against ageing, agents against internal diseases, e.g. cardiovascular diseases, agents against benign or malignant tumours (e.g. cytostatics), agents for prevention of cancer, for prevention or healing of dementia diseases, agents for improving cognitive performance, active compounds for lowering blood coagulation, agents against eye diseases, active compounds for lowering fever, and active compounds for reducing inflammatory diseases.

The formulations according to the invention are preferably embedded and/or encapsulated on and/or in a carrier, and are preferably in the form of capsules, tablets (non-coated and coated tablets, e.g. coatings which are resistant to gastric juice), lacquered tablets, granules, pellets, solid mixtures, dispersions in liquid phases, emulsions, powders, solutions, pastes or other formulations which can be swallowed or chewed as food supplements, microencapsulated, spray-dried, in the form of inclusion complexes or extrusion products, and are optionally added in this form to the intermediate and/or end product to be influenced in flavour. Diacetyl dimer of formula (I) and/or diacetyl trimer of formula (II) processed in this manner has a particularly good stability, also for a relatively long time, and in many cases is easier to process than free diacetyl dimer, in particular in those processing steps which require heating of the goods to be processed.

Diacetyl dimer of formula (I) and/or diacetyl trimer of formula (II) and compositions, formulations or preparations comprising diacetyl dimer of formula (I) and/or diacetyl trimer of formula (II) can furthermore be adsorbed on a carrier which ensures both fine distribution of the diacetyl dimer of formula (I) and/or diacetyl trimer of formula (II) in an end product or a semi-finished product and controlled release during use. Such carriers can be porous inorganic materials, such as light sulfate, silica gels, zeolites, gypsums, clays, clay granules, gas concrete etc., or organic materials, such as woods, cellulose-based substances, sugars or plastics, such as PVC, polyvinyl acetates or polyurethanes.

Formulations according to the invention which comprise diacetyl dimer of formula (I) and/or diacetyl trimer of formula (II) can be prepared by incorporating diacetyl dimer of formula (I) and/or diacetyl trimer of formula (II) (that is to say one of their stereoisomers and/or a mixture consisting of or containing two or more of their respective stereoisomers), as a solid, as a solution or in the form of a mixture with a solid or liquid carrier substance, into a base formulation of a nutrition formulation, an oral hygiene formulation or luxury product. Advantageously, formulations according to the invention in the form of a solution are converted into a solid formulation by spray drying.

The properties of the compositions, formulations and preparations comprising diacetyl dimer of formula (I) and/or diacetyl trimer of formula (II) can optionally be optimized further in respect of a more controlled release of flavour by so-called "coating" with suitable materials, for which purpose waxy materials, e.g. carnauba wax, are preferably used. For the preparation of a formulation according to the invention, according to a further preferred embodiment diacetyl dimer of formula (I) and/or diacetyl trimer of formula (II) and optionally other constituents of the formulation according to the invention can be encapsulated or enclosed in capsules. Preferably, for this purpose diacetyl dimer of formula (I) and/or diacetyl trimer of formula (II) and/or formulations comprising diacetyl dimer of formula (I) and/or diacetyl trimer of formula (II) are first incorporated into emulsions, into liposomes, e.g. starting from phosphatidylcholine, into microspheres, into nanospheres or also into capsules, granules or extrudates of a matrix which is suitable e.g. for foodstuffs and compositions for consumption for pleasure, e.g. of starch, starch derivatives (e.g. modified starches), cellulose or cellulose derivatives (e.g. hydroxypropylcellulose), other polysaccharides (e.g. alginate, curdlan), natural fats, natural waxes (e.g. beeswax, carnauba wax) or of proteins, e.g. gelatine, or other natural products (e.g. shellac). In this context, depending on the matrix, the products can be used by spray drying, spray granulation, melt granulation, coacervation, coagulation, extrusion, melt extrusion, emulsion processes, coating or other suitable encapsulation processes. Particularly preferably, diacetyl dimer of formula (I) and/or diacetyl trimer of formula (II) and/or a formulation comprising diacetyl dimer of formula (I) and/or diacetyl trimer of formula (II) are encapsulated in a multi-component nozzle process, preferably with an immersed nozzle. Such encapsulation processes result in seamless capsules. A concentric two-component nozzle and/or a concentric three-component nozzle are preferably used in this context.

Seamless capsules having a liquid core and a shell surrounding this core are already known. They can be prepared, in particular, via a dripping process with a multi-component nozzle, which is also called a multi-component nozzle process in the context of the present text (cf. Bauer, Frömmig, Führer; Pharmazeutische Technologie; Wissenschaftliche Verlagsgesellschaft mbH, Stuttgart, 6th edition, 1999, p. 347). In the context of this text, references to the multi-component nozzle process here are also to be understood as meaning a reference to a large number of related processes for the preparation of seamless capsules.

In the multi-component nozzle process, capsules having a seamless shell are prepared in the manner of a dripping process. Conventionally, a lipophilic core material and a hot hydrophilic shell solution are pumped simultaneously through a concentric multi-component nozzle such that they drip into a cold lipophilic cooling liquid (cooling bath, curing bath), for example a plant oil. In this context, the nozzle can be immersed directly in the cooling liquid (submerged nozzle process). On dripping in, the capsules assume a ball shape (spherical shape) due to the surface tensions. Due to the lowering in temperature on contact with the cooling liquid, the seamless capsule shell solidifies.

The patent specifications U.S. Pat. No. 4,481,157 and U.S. Pat. No. 4,251,195 describe processes and apparatuses for the continuous preparation of seamless capsules by the multi-component nozzle process, in which the nozzle is immersed in the cooling liquid. These processes are particularly preferred in the context of the present invention.

In a further preferred preparation process, diacetyl dimer of formula (I) and/or diacetyl trimer of formula (II) are first complexed with one or more suitable complexing agents, for example with cyclodextrins or cyclodextrin derivatives, preferably β-cyclodextrin, and employed and/or encapsulated or enclosed in capsules as described above in this complexed form.

A formulation according to the invention in which the matrix is chosen such that diacetyl dimer of formula (I) and/or diacetyl trimer of formula (II) are released from the matrix in delayed form, so that a long-lasting flavour action is obtained, is particularly preferred. A fat, wax, polysaccharide or protein matrix is particularly preferred here.

A microencapsulation of formulations and products comprising diacetyl dimer of formula (I) and/or diacetyl trimer of formula (II) can be carried out, for example, by the so-called coacervation process with the aid of capsule materials e.g. of soft gelatine. The spray-dried formulations and/or products can be prepared, for example, by spray drying of an emulsion or dispersion containing diacetyl dimer, it being possible to use modified starches, proteins, dextrin and plant gums as carrier substances. Inclusion complexes can be prepared e.g. by introducing diacetyl dimer-containing dispersions and cyclodextrins into a suitable solvent, e.g. water. Extrusion products can be obtained by melting the formulations and products comprising diacetyl dimer with a suitable waxy substance and by extrusion with subsequent solidification, optionally in a suitable solvent, e.g. isopropanol.

Other constituents which can be used for formulations according to the invention which serve for nutrition or consumption for pleasure are further conventional base substances, auxiliary substances and additives for foodstuffs or compositions for consumption for pleasure, e.g. water, mixtures of fresh or processed, plant or animal base substances or raw materials (e.g. raw, roasted, dried, fermented, smoked and/or boiled meat, egg, bone, cartilage, fish, crustaceans and shellfish, vegetables, fruit, herbs, nuts, vegetable or fruit juices or pastes or mixtures thereof), digestible or non-digestible carbohydrates (e.g. sucrose, maltose, fructose, glucose, dextrins, amylose, amylopectin, inulin, xylans, cellulose), sugar alcohols, e.g. sorbitol, mannitol, xylitol), natural or hydrogenated fats (e.g. tallow, lard, palm fat, coconut fat, hydrogenated plant fat), fat oils (e.g. sunflower oil, groundnut oil, maize germ oil, thistle oil, olive oil, walnut oil, fish oil, soya oil, sesame oil), fatty acids or salts thereof (e.g. potassium stearate, potassium palmitate), proteinogenic or non-proteinogenic amino acids and related compounds (e.g. taurine, creatine, creatinine), peptides, native or processed proteins (e.g. gelatine), enzymes (e.g. peptidases, glucosidases, lipases), nucleic acids, nucleotides (inositol phosphate), flavour-modulating substances (e.g. sodium glutamate, 2-phenoxypropionic acid), substances which reduce or mask an unpleasant flavour (e.g. hydroxyflavanones according to EP 1,258,200), emulsifiers (e.g. lecithins, diacylglycerols), stabilizers (e.g. carrageenan, alginate, carob bean flour, guar bean flour), preservatives (e.g. benzoic acid, sorbic acid), antioxidants (e.g. tocopherol or derivatives thereof, ascorbic acid or derivatives thereof), chelating agents (e.g. citric acid), organic or inorganic acidifying agents (e.g. malic acid, acetic acid, citric acid, tartaric acid, phosphoric acid), bitter principles (e.g. quinine, caffeine, limonin), sweeteners, mineral salts (e.g. sodium chloride, potassium chloride, magnesium chloride, sodium phosphates), substances which prevent enzymatic browning (e.g. sulfite, ascorbic acid), essential oils, plant extracts, natural or synthetic dyestuffs or coloured pigments (e.g. carotenoids, flavonoids, anthocyans, chlorophyll and derivatives thereof), spices, as well as odoriferous substances, synthetic, natural or nature-identical aromatic and flavouring substances.

Sweeteners in the context of the invention can be, for example, sweet-tasting carbohydrates (e.g. sucrose, trehalose, lactose, maltose, melicitose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde, maltodextrin) or plant formulations comprising chiefly these carbohydrates (e.g. from sugar beet (*Beta vulgaris* ssp., sugar fractions, sugar syrup, molasses), from sugar cane (*Saccharum officinarum* ssp., e.g. molasses, sugar syrups), from sugar maple (*Acer* ssp.), from agave (agave thick juice), synthetic/enzymatic hydrolysates of starch or sucrose (e.g. invert sugar syrup, highly concentrated fructose syrups from maize starch), fruit concentrates (e.g. from apples or pears, apple leaf, pear leaf)), sugar alcohols (e.g. erythritol, threitol, arabitol, ribitol, xylitol, sorbitol, mannitol, dulcitol, lactitol), proteins (e.g. miraculin, monellin, thaumatin, curculin, brazzein), sweetening substances (magap, sodium cyclamate, acesulfame K, neohesperidin dihydrochalcone, saccharin sodium salt, aspartame, superaspartame, neotame, alitame, sucralose, stevioside, rebaudioside, lugduname, carrelame, sucrononate, sucrooctate, monatin, phyllodulcin), certain sweet-tasting amino acids (glycine, D-leucine, D-threonine, D-asparagine, D-phenylalanine, D-tryptophan, L-proline), other sweet-tasting low molecular weight substances, (e.g. hernandulcin, dihydrochalcone glycosides, glycyrrhizin, glycyrrhetic acid ammonium salt or other glycyrrhetic acid derivatives), extracts from liquorice (*Glycyrrhizza glabra* ssp.), extracts from *Lippia dulcis*, extracts or individual substances from *Momordica* ssp. (in particular *Momordica grosvenori* [Luo Han Guo] and the mogrosides obtained therefrom), from *Hydrangea dulcis* or from *Stevia* ssp. (e.g. *Stevia rebaudiana*).

Other constituents which can be used for the oral pharmaceutical formulations according to the invention are all the conventionally further active compounds, base substances, auxiliary substances and additives for oral pharmaceutical formulations. The active compounds, base substances, auxiliary substances and additives can be converted into the oral administration forms in a manner known per se. This is effected using inert, non-toxic, pharmaceutically suitable auxiliary substances. These include, inter alia, carrier substances (e.g. microcrystalline cellulose), solvents (e.g. liquid polyethylene glycols), emulsifiers (e.g. sodium dodecyl sulfate), dispersing agents (e.g. polyvinylpyrrolidone), synthetic and natural biopolymers (e.g. albumin), stabilizers (e.g. antioxidants, such as ascorbic acid), dyestuffs (e.g. inorganic pigments, such as iron oxides) or smell correctants as well as flavour correctants.

Preferably, formulations according to the invention comprise an aromatic composition in order to round off and refine the flavour and/or smell of the formulation. Suitable aromatic compositions comprise e.g. synthetic, natural or nature-identical aromatic substances and/or flavouring substances and/or odoriferous substances and/or aromatizing plant extracts.

The fat- and/or oil-containing formulations according to the invention are as a rule in the form of anhydrous lipophilic systems or in the form of aqueous emulsions, it being possible for them to be in the form of either "water-in-oil", "oil-in-water", "water-in-oil-in-water" or "oil-in-water-in-oil" emulsions.

Fats and oils in the context of the invention are all lipids which serve for nutrition or consumption for pleasure and are therefore toxicologically acceptable, for example naturally occurring or processed triglycerides, diglycerides or monoglycerides, fatty acid mono- or oligoesters of other polyhydric alcohols (e.g. of propylene glycol, carbohydrates or sugar alcohols), sterols or fatty acid esters thereof, phytosterols or fatty acid esters thereof, free fatty acids or salts thereof, estolides, fatty acid esters of primary alcohols (e.g. ethanol), phospholipids (e.g. phosphatidylcholine, lecithins, phosphatidylserine), ceramides and ceramide derivatives (e.g. sphingamines, cerebrosides, ceramides) and naturally occurring or synthetically prepared mixtures thereof.

A further aspect of the invention relates to the use of the compositions or formulations according to the invention as semi-finished goods, in particular with the aim of aromatization of finished goods produced from the semi-finished goods.

The compositions or formulations according to the invention, which preferably serve as semi-finished goods, preferably comprise 0.0001 wt. % to 95 wt. %, preferably 0.001 to 80 wt. %, but in particular 0.01 wt. % to 50 wt. %, based on the total weight of the formulation, of the diacetyl dimer of formula (I) and/or diacetyl trimer of formula (II) to be used according to the invention (that is to say of one of their stereoisomers and/or a mixture consisting of or containing two or more of their respective stereoisomers) and optionally one or more other flavouring and aromatic substances as well as optionally one or more carrier and auxiliary substances and/or solvents.

EXAMPLES

Example 1

Diacetyl Dimer of Formula (I)

A racemic mixture of diacetyl dimer of formula (I) (comprising all 4 isomeres (Ia), (Ib), (Ic) and (Id)) which was prepared in accordance with the abovementioned instructions of Diels et al. in Chem. Ber. 1914, 47, 2355-2365 and optionally purified according to the procedure described by Birch et al. in J. Chem. Soc. 1957, 412-414 was used in the following examples:

Diacetyl (5 g) was mixed with water (20 g) and $CaCO_3$ (50 mg) was added. The mixture was stored in a stoppered vessel at 5° C. over night. The solution was acidified with diluted HCl and extracted with tert.-butylmethylether. The organic phases were washed with saturated sodium chloride solution, dried over $Na_2SO_4$ and the solvent and remaining diacetyl were evaporated in vacuo to yield 2.5 g diacetyl dimer of formula (I).

According to the NMR the main isomer (80% of all isomers) was the enantiomeric couple (Ia) and (Ib) (denoted *), the minor isomer (20% of all isomers) the enantiomeric couple (Ic) and (Id) (denoted **): $^1$H-NMR (400 MHz, $CDCl_3$): δ=3.37 (1H*, d, 19.1 Hz, H-4a), 2.94 (1H, d, 19.1 Hz, H-4a), 2.6 (1H, d, 19.1 Hz, H-4b), 2.34 (3H*, s, H-7), 2.29 (3H*, s, H-7), 2.25 (1H*, d, 19.0 Hz, H-4b), 1.61 (3H**, s, H-8 or 9), 1.52 (3H*, s, H-8 or 9), 1.51 (3H*, s, H-8 or 9), 1.48 (3H**, s, H-8 or 9) ppm.

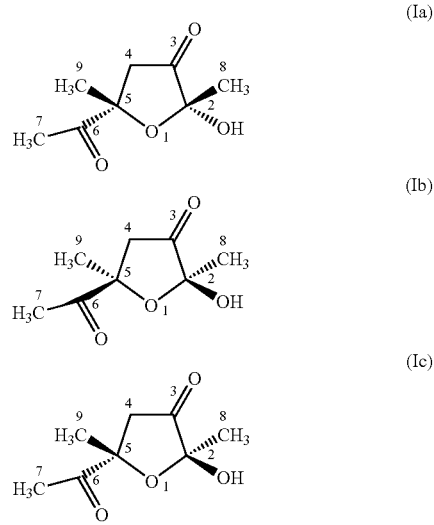

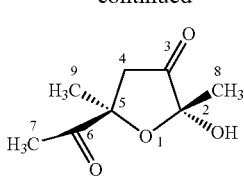

$^{13}$C-NMR (100 MHz, CDCl$_3$): δ=210.8 (C, C-6), 208.5 (C, C-3), 98.7 (C, C-2), 84.1 (C, C-5), 40.9 (CH$_2$, C-4), 24.6 (CH$_3$, C-7), 24.2 (CH$_3$, C-9), 21.7 (CH$_3$, C-8) ppm.

In the $^{13}$C-NMR spectra only the main isomer, the enantiomeric couple (Ia) and (Ib) was detected.

Example 1a

Characterization of Diacetyl Trimer (II)

A racemic mixture which was prepared in accordance with the instructions of Poje and Perina in Tetrahedron 195, 41, 1985-1987 was used in the following examples. The mixture contained the following stereoisomers:

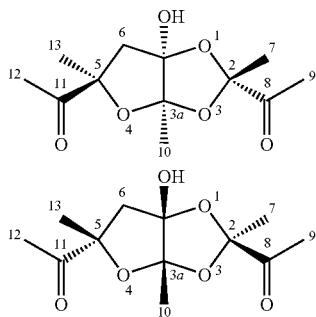

MS (EI, 70 eV): m/z=215 (6%), 155 (7%), 129 (16%), 111 (6%), 87 (13%), 85 (14%), 43 (100%).

$^1$H-NMR (400 MHz, CDCl$_3$): δ=4.67 (1H, bs, OH), 3.23 (1H, d, J=13.6 Hz, H-6), 2.35 (3H, s, H-12), 2.25 (3H, s, H-9), 1.92 (1H, d, J=13.6 Hz, H-6), 1.46 (3H, s, H-7), 1.40 (3H, s, H-10), 1.35 (3H, s, H-13) ppm.

$^{13}$C-NMR (100 MHz, CDCl$_3$): δ=210.42 (C, C-11), 208.05 (C, C-8), 114.49 (C, C6a), 112.50 (C, C-3a), 108.36 (C, C-2), 87.51 (C, C-5), 44.53 (CH$_2$, C-6), 25.10 (CH$_3$, C-9), 24.89 (CH$_3$, C-13), 24.87 (CH$_3$, C-12), 21.28 (CH$_3$, C-10), 20.90 (CH$_3$, C-7) ppm.

Example 1c

Production of an Aromatic and/or Flavouring Composition Containing Diacetyl Dimer of Formula (I) and Diacetyl Trimer of Formula (II)

Marble powder (5.6 g) was put into a small filter bag (cellulose). Diacetyl (247 g) was filled in a aluminium can and the filter bag was placed into the liquid. After standing for 2 weeks the filter bag was removed and the product was directly used. The product contained only traces of the starting material diacetyl; the main components were the two diacetyl dimer enantiomeric couples of formula (Ia)/(Ib) (denoted *) and (Ic)/(Id) (denoted ), respectively and diacetyl trimer (denoted *) of formula (II) in a ration 10:1:10 (referred to $^1$H-NMR integral data). The partly solid product can be used as such or e.g. as a solution in triacetin or medium chain triglycerides or other fats and oils.

$^1$H-NMR of the reaction mixture: (400 MHz, CDCl$_3$): 3.37 (1H*, d, 19.3 Hz), 3.217 (1H*, d, 13.6 Hz), 2.95 (1H, d, 19 Hz), 2.61 (1H**, d, 19 Hz), 2.34 (s), 2.336 (s), 2.25 (s), 2.248 (s), 1.92 (d, 13.6 Hz), 1.6-1.25 (m) ppm.

Example 2

Tasting in Sweet/Salty Solution

The actions found were evaluated with a scale of from 1 (action scarcely perceptible) to 9 (action highly perceptible).

The 5-acetyl-2,5-dimethyl-2-hydroxy-tetrahydrofuran-3-one from Example 1 (2 ppm diacetyl dimer of formula (I) in aqueous 5 wt. % sucrose or 0.5% sodium chloride solution) was investigated for its flavouring action by 9 testers. The evaluation resulted in the following flavour profile for the diacetyl dimer of formula (I): cream (5), butter (5), sweet (5), vanillin (3), caramel (3), toffee (4), intensity (5), fullness (6), soft (6)

The 2,5-diacetyl-3a,5,6,6a-tetrahydro-6a-hydroxy-2,3a,5-trimethylfuro[2,3-d]-1,3-dioxole from Example 1a (1 ppm diacetyl trimer of formula (II) in aqueous 5 wt. % sucrose or 0.5% sodium chloride solution) was investigated for its flavouring action by 9 testers. The evaluation resulted in the following flavour profile for the diacetyl trimer: fatty (oily) (7), cream (6), butter (8), sweet (6), vanillin (3), caramel (4), toffee (6), fresh cheese/quark (4), intensity (6), impact (7), fullness (7), adhesive (8), soft (6).

The aromatic and/or flavouring composition containing diacetyl dimer of formula (I) and diacetyl trimer of formula (II) from example (1b) (1 ppm of the composition in aqueous 5 wt. % sucrose or 0.5% sodium chloride solution) was investigated for its flavouring action by 7 testers. The evaluation resulted in the following flavour profile: fatty (oily) (5), cream (6), butter (7), sweet (6), vanillin (3), caramel (4), toffee (6), fresh cheese/quark (4), intensity (6), fullness (7), adhesive (6), soft (6)

For comparison, a flavour profile of diacetyl (1 ppm in aq. 5% sucrose or 0.5% sodium chloride solution) was produced under otherwise identical conditions: fatty (oily) (5), cream (5), butter (7), milk (4), condensed milk (4), fruity (2), cheesy (2), sweet (4), vanillin (2), intensity (7), impact (7), fullness (7), adhesive (5), soft (6).

Example 3

Intensification of the Sweetness Impression in an Aqueous Solution

In each case 2 samples (see below) were given in randomized sequence to a panel of 16 testers, with the request to indicate the sweetness intensity on a scale of from 1 (weak) to 10 (intense) and to describe the samples.

Of the 16 testers, 12 testers found sample 2, 3 and 4 respectively sweeter and 4 testers sample 1.

Result:

| Sample | Composition | Sweetness intensity | Flavour impression |
|---|---|---|---|
| Sample 1 | 5% strength sugar solution | 5.6 ± 1.3 | sweet |
| Sample 2 | 5% strength sugar solution + 10 ppb diacetyl dimer of formula (I) | 6.8 ± 1.2 | buttery, cream, creamy, fullness in the mouth, sweet, vanilla, caramel |
| Sample 3 | 5% strength sugar solution + 10 ppb diacetyl trimer of formula (II) | 6.9 ± 1.2 | buttery, cream, creamy, fullness in the mouth, sweet, vanilla, caramel |
| Sample 4 | 5% strength sugar solution + 5 ppb diacetyl dimer of formula (I) + 5 ppb diacetyl trimer of formula (II) | 7.1 ± 1.2 | buttery, cream, creamy, fullness in the mouth, sweet, vanilla, caramel |

Example 4

Intensification of the Sweetness Impression in a Low-Fat Yoghurt

In each case 2 samples were given in randomized sequence to a panel of 15 testers, with the request to indicate the sweetness intensity on a scale of from 1 (weak) to 10 (intense) and to describe the samples. A yoghurt of the brand Optiwell 0.1% natur (Campina GmbH & Co. KG, Heilbronn) was used as the low-fat yoghurt.

Of the 15 testers, 13 testers found samples 2 and 3 sweeter and 2 testers sample 1.

Result:

| Sample | Composition | Sweetness intensity | Flavour impression |
|---|---|---|---|
| Sample 1 | Optiwell Joghurt 0.1% fat + 5% sugar | 5.1 ± 1.1 | sour |
| Sample 2 | Optiwell Joghurt 0.1% fat + 5% sugar + 1 ppm diacetyl dimer of formula (I) | 6.7 ± 2.0 | sweet, buttery, fullness in the mouth, fruity, syrup, milky, soft, creamy |
| Sample 3 | Optiwell Joghurt 0.1% fat + 5% sugar + 0.5 ppm diacetyl dimer of formula (I) + 0.5 ppm diacetyl trimer of formula (II) | 7.0 ± 1.3 | sweet, buttery, fullness in the mouth, fruity, syrup, milky, soft, creamy |

Example 5

Half-Fat Margarine

| No. | Constituent | Wt. % content | Content/g |
|---|---|---|---|
| 1 | Hydrogenated plant fat (regular household goods) | 40.00 | 600.0 |
| 2 | Drinking water | 55.38 | 830.7 |
| 3 | Salt | 0.20 | 3.0 |
| 4 | Monoglyceride Monomuls 90-35 (Grünau/Cognis) | 0.80 | 12.0 |
| 5 | Citric acid | 0.02 | 0.3 |
| 6 | Whey protein | 1.50 | 22.5 |
| 7 | Lecithin | 2.00 | 30.0 |
| 8 | β-Carotene emulsion | | 8 drops |
| 9 | Flavour, containing 0.1% diacetyl dimer of formula (I) | 0.1 | 1.5 |

The water and fat were heated separately to approx. 55° C. The salt, citric acid, whey protein and β-carotene emulsion were stirred into the water and distributed homogeneously. The Monoglyceride Monomuls and lecithin were introduced into the fat phase and distributed uniformly. The aqueous phase was added slowly to the fat phase and the mixture was stirred first slowly (300 rpm) and then vigorously (1,500 rpm, 30 sec, blade insert, Ultraturrax). Finally, the flavour was stirred in. The mixture was cooled down to 35° C., transferred to containers and stored under cool conditions (5° C.).

The reduced-fat margarine obtained tastes similar to a full-fat margarine which is free from diacetyl dimer of formula (I) sand has a fat content of 80 wt. %.

Example 6

Cream Ice-Cream

| No. | Constituent | A wt.-% | B wt.-% |
|---|---|---|---|
| 1 | Skimmed milk | 60.65 | 60.65 |
| 2 | Plant fat, melting range 35-40° C. | 16.50 | 16.50 |
| 3 | Sugar | 12.00 | 12.00 |
| 4 | Skimmed milk powder | 5.00 | 5.00 |
| 5 | Glucose syrup 72% dry matter | 5.00 | 5.00 |
| 6 | Emulgator SE 30 (Grindstedt Products, Denmark) | 0.65 | 0.65 |
| 7a | Flavour, containing 0.1% diacetyl dimer of formula (I) and 1% vanillin | 0.20 | — |
| 7b | Flavour, containing 0.05% diacetyl dimer of formula (I), 0.05% diacetyl trimer of formula (II) and 1% vanillin | — | 0.20 |

The skimmed milk and glucose syrup were heated to 55° and the sugar, skimmed milk powder and emulsifier were added. The plant fat was preheated and the entire composition was heated to 58° C. After addition of the flavour 7a) or 7b), the mixture was homogenized (180/50 bar). The compositions A and B respectively obtained were kept hot at 78° C. for 1 min and then cooled down to 2-4° C. and left to mature for 10 h. Thereafter, the matured compositions A and B were transferred to containers and stored in the frozen state at −18° C.

The reduced-fat ice-creams A and B respectively obtained tasted similar to an ice-cream which is free from diacetyl dimer of formula (I) or free of a combination of diacetyl dimer of formula (I) and diacetyl trimer of (formula (II) and of otherwise the same composition with a fat content of 20%.

Example 7

Reduced-Fat Cheese Crackers

| No. | Constituent | % content | Content/g |
|---|---|---|---|
| 1 | Wheat flour type 405 | 60.00 | 600.0 |
| 2 | Plant fat | 7.44 | 74.4 |
| 3 | Glucose syrup | 1.64 | 16.4 |
| 4 | Cold tap water | 19.40 | 194.0 |
| 5 | Salt | 0.45 | 4.5 |
| 6 | Sodium bicarbonate | 0.44 | 4.4 |
| 7 | Whey powder | 2.00 | 20.0 |
| 8 | Sodium glutamate | 0.09 | 0.9 |
| 9 | Ammonium bicarbonate | 1.58 | 15.8 |
| 10 | Lactic acid | 0.22 | 2.2 |
| 11 | Sodium pyrosulfite | 0.02 | 0.2 |
| 12 | Ice/water | 0.58 | 5.8 |
| 13 | Cheese powder | 4.00 | 40.0 |
| 14 | Sugar | 1.79 | 17.9 |
| 15 | Flavour, containing 0.1% diacetyl dimer of formula (I) | 0.35 | 3.5 |

All the ingredients were introduced into a precooled Z mixer at 75 rpm and kneaded until the dough had a temperature of 25° C. (approx. 10 min). The dough was left to rest for 15 min and then rolled out, left to rest for 10 min, shaped and baked at 230° C. for approx. 5 min. After the baking, the hot crackers were sprayed immediately with a plant oil emulsion.

The reduced-fat crackers obtained tasted similar to crackers which are free from diacetyl dimer of formula (I) and of otherwise the same composition with a fat content of 20-25%.

Example 8

Reduced-Fat Sweet Biscuits

| No. | Constituent | A wt.-% | B wt.-% |
|---|---|---|---|
| 1 | Wheat flour 405 | 60.00 | 59.95 |
| 2 | Baking margarine | 13.00 | 13.00 |
| 3 | Sugar | 10.00 | 10.00 |
| 4 | Invert sugar syrup | 10.00 | 10.00 |
| 5 | Milk | 5.40 | 5.40 |
| 6 | Baking powder | 0.70 | 0.70 |
| 7 | Salt | 0.50 | 0.50 |
| 8a | Flavour, containing 0.1% diacetyl dimer of formula (I) | 0.15 | — |
| 8b | Flavour, containing 0.01% diacetyl dimer of formula (I), 0.07% diacetyl trimer of formula (II) and 0.7% vanillin | — | 0.20 |
| 9 | Mono-diglyceride emulsifier | 0.25 | 0.25 |

All the ingredients were introduced into a precooled Z mixer at 75 rpm and kneaded until the dough had a temperature of 25° C. (approx. 10 min). The dough A and B were left to rest for 15 min and then rolled out, left to rest for 10 min, shaped and baked at 230° C. for approx. 5 min.

The reduced-fat biscuits A and B respectively obtained tasted similar to biscuits which are free from diacetyl dimer of formula (I) or free of diacetyl dimer of formula (I) and diacetyl trimer of formula (II) and of otherwise the same composition with a fat content of 20-30%.

Example 9

Seamless Capsules for Direct Consumption

The constituents for the shell mixture given in the following table were brought together and heated at 80° C. in a water-bath until a clear solution substantially free from air bubbles was formed. Solutions having dry matter contents of 20-40 wt. % are preferably used.

| Capsule diameter [mm] | Shell thickness [μm] | Shell content [wt. %] | Core content [wt. %] | Composition of shell | Composition of core | Dissolving in the mouth [sec] |
|---|---|---|---|---|---|---|
| 5 | 64 | 9 | 91 | 70% pig gelatine, 260 bloom 20% glycerol 9% water 0.5% aspartame 0.5% acesulfame K | 40% flavour with diacetyl dimer of formula (I) 60% plant oil | 40 sec |

The core liquid containing diacetyl dimer of formula (I) is provided at 10 to 20° C. The shell liquid and core liquid are fed via a pump system to a concentric two-component nozzle. During this operation, the line for the shell liquid is kept at 60 to 80° C. The concentric two-component nozzle is immersed in a liquid bath filled with plant oil. The temperature of this oil bath is approx. 10 to 15° C.

The stream of liquid emerging from the nozzle into the oil base breaks down, assisted by additional vibratory agitation of the liquid, into individual drops, which are seamless capsules of core and shell.

The still wet capsules are separated from the adhering oil by centrifugation and are then dried under constant agitation in a dry stream of air. Conventional fluidized bed dryers or drum dryers can be used. A prerequisite for a good drying success is that the capsules can be kept agitated by rotation or by air turbulence.

In some cases, the use of a flow auxiliary is advisable for this. However, the use of a flow auxiliary is not always desirable. A transparent and shiny shell is achieved if the composition of the shell mixture is chosen such that a flow auxiliary, such as, for example, silica, can be dispensed with during drying, and sticking of the capsules nevertheless does not occur.

Specific Embodiments

Specific embodiment one comprises use of 5-acetyl-2,5-dimethyl-2-hydroxy-tetrahydrofuran-3-one according to formula (I) in the form of one of its stereoisomers or in the form of a mixture consisting of or containing two, three or four of its stereoisomers

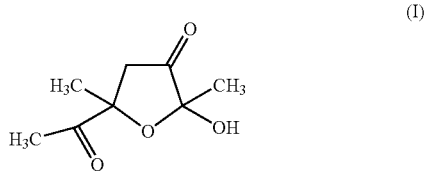

(I)

for imparting, intensifying and/or modifying a creamy and/or fatty sensation in the mouth, for imparting, intensifying and/or modifying a sweet, buttery, cream-like and/or creamy flavour; and/or as an aromatic and/or flavouring substance.

Specific embodiment two comprises a use according to specific embodiment one, wherein 5-acetyl-2,5-dimethyl-2-hydroxy-tetrahydrofuran-3-one is used in combination with one, two, three, four, five, six, seven, eight, nine, ten or more aromatic and/or flavouring substances different from 5-acetyl-2,5-dimethyl-2-hydroxy-tetrahydrofuran-3-one.

Specific embodiment three comprises a use according to specific embodiment two, wherein 5-acetyl-2,5-dimethyl-2-hydroxy-tetrahydrofuran-3-one is used in combination with 2,5-diacetyl-3a,5,6,6a-tetrahydro-6a-hydroxy-2,3a,5-trimethylfuro[2,3-d]-1,3-dioxole (diacetyl trimer of formula (II))

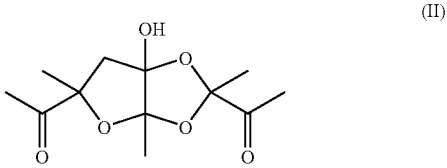

(II)

in the form of one of its stereoisomers or in the form of a mixture consisting of or containing two or more of its stereoisomers as the or as one of the aromatic and/or flavouring substances.

Specific embodiment four comprises a process (i) for imparting, intensifying and/or modifying a creamy and/or fatty sensation in the mouth, and/or (ii) for imparting, intensifying and/or modifying a sweet, buttery, cream-like and/or creamy flavour, with the steps:

a) provision of 5-acetyl-2,5-dimethyl-2-hydroxy-tetrahydrofuran-3-one (diacetyl dimer of formula (I)) or a mixture comprising 5-acetyl-2,5-dimethyl-2-hydroxy-tetrahydrofuran-3-one, wherein the 5-acetyl-2,5-dimethyl-2-hydroxy-tetrahydrofuran-3-one is in the form of one of its stereoisomers or in the form of a mixture consisting of two, three or four of its stereoisomers; and bringing into contact or mixing of
5-acetyl-2,5-dimethyl-2-hydroxy-tetrahydrofuran-3-one or the mixture thereof provided in step a), wherein 5-acetyl-2,5-dimethyl-2-hydroxy-tetrahydrofuran-3-one is respectively present in a sensorially active amount, with a substance optionally comprising one, two, three, four, five, six, seven, eight, nine, ten or more aromatic and/or flavouring substances different from 5-acetyl-2,5-dimethyl-2-hydroxy-tetrahydrofuran-3-one.

Specific embodiment five comprises a process according to specific embodiment four, wherein the mixture of 5-acetyl-2,5-dimethyl-2-hydroxy-tetrahydrofuran-3-one in step a) comprises 5-acetyl-2,5-dimethyl-2-hydroxy-tetrahydrofuran-3-one and 2,5-diacetyl-3a,5,6,6a-tetrahydro-6a-hydroxy-2,3a,5-trimethylfuro[2,3-d]-1,3-dioxole (diacetyl trimer of formula (II)), wherein 5-acetyl-2,5-dimethyl-2-hydroxy-tetrahydrofuran-3-one and 2,5-diacetyl-3a,5,6,6a-tetrahydro-6a-hydroxy-2,3a,5-trimethylfuro[2,3-d]-1,3-dioxole independently of each other are in the form of one of their stereoisomers or in the form of a mixture consisting of or containing two or more of the respective stereoisomers, or the substance of step b) comprises as the or as one of the aromatic and/or flavouring substances 2,5-diacetyl-3a,5,6,6a-tetrahydro-6a-hydroxy-2,3a,5-trimethylfuro[2,3-d]-1,3-dioxole (diacetyl trimer of formula (II)) in the form of one of its stereoisomers or in the form of a mixture consisting of or containing two or more of its stereoisomers.

Specific embodiment six comprises an aromatic and/or flavouring composition, comprising as components:

a sensorially active amount of 5-acetyl-2,5-dimethyl-2-hydroxy-tetrahydrofuran-3-one (diacetyl dimer of formula (I)) in the form of one of its stereoisomers or in the form of a mixture consisting of or containing two, three or four of its stereoisomers, and one, two, three, four, five, six, seven, eight, nine, ten or more aromatic and/or flavouring substances different from 5-acetyl-2,5-dimethyl-2-hydroxy-tetrahydrofuran-3-one (diacetyl dimer of formula (I)), with the proviso that the aromatic and/or flavouring is not a composition comprising:

5-acetyl-2,5-dimethyl-2-hydroxy-tetrahydrofuran-3-one (diacetyl dimer of formula (I)) and one (i) or more hydroxides of an alkaline metal selected from NaOH and KOH, and/or (ii) sulfuric acid but no further aromatic and/or flavouring substances, or 5-acetyl-2,5-dimethyl-2-hydroxy-tetrahydrofuran-3-one (diacetyl dimer of formula (I)), and (i) diacetyl or (ii) 2,5-dimethyl-3-(2H)-furanone but no further aromatic and/flavouring substance.

Specific embodiment seven comprises an aromatic and/or flavouring composition according to specific embodiment six, wherein component (b) comprises 2,5-diacetyl-3a,5,6,6a-tetrahydro-6a-hydroxy-2,3a,5-trimethylfuro[2,3-d]-1,3-dioxole (diacetyl trimer of formula (II)) in the form of one of its stereoisomers or in the form of a mixture consisting of or containing two or more of its stereoisomers as the or as one of the aromatic and/or flavouring substances.

Specific embodiment eight comprises a formulation selected from a nutrition formulation (foodstuff), an oral hygiene formulation, a luxury product, an oral pharmaceutical formulation or a semi-finished good for the preparation of nutrition formulations or luxury product, comprising as components:
(a) a sensorially active amount of 5-acetyl-2,5-dimethyl-2-hydroxy-tetrahydrofuran-3-one (diacetyl dimer of formula (I)) in the form of one of its stereoisomers or in the form of a mixture consisting of or containing two, three or four of its stereoisomers,
or
(b) an aromatic and/or flavouring composition according to any of specific embodiments six or seven,
and
(c) conventional base substances, auxiliary substances and additives for said formulations.

Specific embodiment nine comprises a preparation comprising one or more compositions according to any of specific embodiments six or seven, or one or more formulations according to specific embodiment eight, wherein said composition or formulation is dissolved, dispersed, embedded and/or encapsulated on and/or in a carrier.

Specific embodiment ten comprises a formulation according to specific embodiment eight, or preparation according to specific embodiment nine, wherein said formulation or preparation is selected from the group consisting of
baked goods, preferably bread, dry biscuits, cakes, other baked products; confectionery, preferably chocolate, chocolate bar products, other bar products, fruit gum, hard and soft caramels, chewing gum; alcoholic or non-alcoholic drinks, preferably coffee, tea, wine, wine-containing drinks, beer, beer-containing drinks, liqueurs, schnapps, brandies, fruit-containing carbonated drinks, isotonic drinks, refreshing drinks, nectars, fruit and vegetable juices, fruit or vegetable juice formulations; instant drinks, preferably instant cocoa drinks, instant tea drinks, instant coffee drinks; meat products, preferably ham, fresh sausage or uncooked sausage formulations, seasoned or marinated fresh or salted meat products; eggs or egg products, preferably dried egg, egg white, egg yolk; cereal products, preferably breakfast cereals, muesli bars, precooked ready-made rice products, puffed rice or popcorn; dairy products, preferably milk drinks, milk ice, yoghurt, kefir, fresh cheese, soft cheese, hard cheese, dried milk powder, whey, butter, buttermilk; fruit formulations, preferably preserves, fruit-flavoured ice-cream, fruit sauces, fruit fillings; vegetable formulations, preferably ketchup, sauces, dried vegetables, frozen vegetables, precooked vegetables, cooked vegetables; nibbles, preferably baked or fried potato chips or potato paste products, extrudates based on maize or peanuts; fat- or oil-based products or emulsions thereof, preferably margarine, spreading products, mayonnaise, remoulade, dressings; other ready-made dishes and soups, preferably dried soups, instant soups, precooked soups; spices, spice mixtures, in particular, sprinkling spices (seasonings),
dental care compositions, preferably toothpastes, tooth gels, tooth powders, mouthwashes, chewing gums and other oral care compositions,
capsules, tablets, non-coated or coated tablets, preferably with coatings which are resistant to gastric juice; lacquered tablets, granules, pellets, solid mixtures, dispersions in liquid phases, emulsions, powders, solutions, pastes or other formulations which can be swallowed or chewed, which also comprise, in addition to diacetyl dimer of formula (I), other pharmaceutical active compounds or active compounds which are suitable for foodstuff supplements, and are used as medicaments which are available only on prescription or are available only from pharmacies or other medicaments or as food supplements.

The invention claimed is:
1. A process (i) for imparting, intensifying or modifying a creamy or fatty sensation in the mouth, or (ii) for imparting, intensifying or modifying a sweet, buttery, cream-like or creamy flavour comprising:
a) obtaining a stereoisomer of 5-acetyl-2,5-dimethyl-2-hydroxy-tetrahydrofuran-3-one or a mixture comprising two, three or four stereoisomers of 5-acetyl-2,5-dimethyl-2-hydroxy-tetrahydrofuran-3-one; and
b) bringing into contact or mixing the stereoisomer or mixture obtained in step a) with
a flavoring substance comprising a stereoisomer of 2,5-diacetyl-3a,5,6,6a-tetrahydro-6a-hydroxy-2,3a,5-trimethylfuro[2,3-d]-1,3-dioxole, or a mixture comprising two or more stereoisomers of 2,5-diacetyl-3a,5,6,6a-tetrahydro-6a-hydroxy-2,3a,5-trimethylfuro[2,3-d]-1,3-dioxole.
2. A flavoring composition comprising:
(a) a stereoisomer of 5-acetyl-2,5-dimethyl-2-hydroxy-tetrahydrofuran-3-one, or a mixture comprising two, three or four stereoisomers of 5-acetyl-2,5-dimethyl-2-hydroxy-tetrahydrofuran-3-one, and
(b) a flavoring substance comprising a stereoisomer of 2,5-diacetyl-3a,5,6,6a-tetrahydro-6a-hydroxy-2,3a,5-trimethylfuro[2,3-d]-1,3-dioxole, or a mixture comprising two or more stereoisomers of 2,5-diacetyl-3a,5,6,6a-tetrahydro-6a-hydroxy-2,3a,5-trimethylfuro[2,3-d]-1,3-dioxole.
3. A formulation comprising the flavoring composition according to claim 2; and a conventional base substance, auxiliary substance, or additive for said formulation, wherein the formulation is selected from the group consisting of a nutrition formulation, foodstuff, an oral hygiene formulation, and an oral pharmaceutical formulation.
4. The formulation according to claim 3, wherein the formulation is dissolved, dispersed, embedded, or encapsulated on, or in, a carrier.
5. The formulation according to claim 3, wherein the formulation is selected from the group consisting of:
baked goods, confectionery, fruit gum, hard and soft caramels, chewing gum; alcoholic or non-alcoholic drinks; meat products; eggs or egg products; cereal products, muesli bars, precooked ready-made rice products, puffed rice or popcorn; dairy products; fruit formulations; vegetable formulations; nibbles; fat- or oil-based products, or emulsions thereof; other ready-made dishes; soups; spices, or spice mixtures,
dental care compositions, and
capsules, tablets, non-coated or coated tablets; lacquered tablets, granules, pellets, solid mixtures, dispersions in liquid phases, emulsions, powders, solutions, or pastes.
6. The formulation according to claim 5, wherein the baked goods are bread, dry biscuits, or cakes.
7. The formulation according to claim 5, wherein the confectionery is chocolate, chocolate bar products, or other bar products.
8. The formulation according to claim 5, wherein the non-alcoholic or alcoholic drinks are coffee, tea, wine, wine-containing drinks, beer, beer-containing drinks, liqueurs, schnapps, brandies, fruit-containing carbonated drinks, isotonic drinks, nectars, fruit and vegetable juices, fruit or vegetable juice formulations; milk drinks, or instant drinks.

9. The formulation according to claim 8, wherein the instant drinks are instant cocoa drinks, instant tea drinks, or instant coffee drinks.

10. The formulation according to claim 5, wherein the meat products are ham, fresh sausage or uncooked sausage, seasoned fresh or salted meat products, or marinated fresh or salted meat products.

11. The formulation according to claim 5, wherein the egg or egg products are dried egg, egg white, egg yolk.

12. The formulation according to claim 5, wherein the cereals are breakfast cereals.

13. The formulation according to claim 5, wherein the dairy products are milk drinks, milk ice, yoghurt, kefir, fresh cheese, soft cheese, hard cheese, dried milk powder, whey, butter, or buttermilk.

14. The formulation according to claim 5, wherein the fruit formulations are preserves, fruit-flavored ice-cream, fruit sauces, or fruit fillings.

15. The formulation according to claim 5, wherein the vegetable formulations are ketchup, sauces, dried vegetables, frozen vegetables, precooked vegetables, or cooked vegetables.

16. The composition according to claim 2, wherein a total weight ratio of the (a) 5-acetyl-2,5-dimethyl-2-hydroxy-tetrahydrofuran-3-one to (b) 2,5-diacetyl-3a,5,6,6a-tetrahydro-6a-hydroxy-2,3a,5-trimethylfuro[2,3-d]-1,3-dioxole is in a range of from 10:1 to 1:10.

17. The composition according to claim 2, wherein a total weight ratio of the (a) 5-acetyl-2,5-dimethyl-2-hydroxy-tetrahydrofuran-3-one to (b) 2,5-diacetyl-3a,5,6,6a-tetrahydro-6a-hydroxy-2,3a,5-trimethylfuro[2,3-d]-1,3-dioxole is in a range of from 5:1 to 1:5.

18. The composition according to claim 2, wherein the composition is adsorbed on a carrier.

19. The formulation according to claim 3, wherein the pH of the formulation is less than 8.5.

20. The formulation according to claim 3, wherein the pH of the formulation is between 2 and 8.

* * * * *